United States Patent
Johannesson et al.

(10) Patent No.: US 7,182,249 B2
(45) Date of Patent: Feb. 27, 2007

(54) APPARATUS AND METHOD FOR OBTAINING DATA FROM A DOCUMENT

(75) Inventors: Glen Johannesson, Waterloo (CA); Jeff Dayman, Waterloo (CA); Kevin Michener, St. Clements (CA); Jeff Davis, Waterloo (CA); Brian Johannesson, Kitchener (CA); Graham Heit, Waterloo (CA); Bill Stefanuk, Waterloo (CA); Fred Brouwer, Baden (CA)

(73) Assignee: RDM Corporation, Waterloo (CA)

( * ) Notice: Subject to any disclaimer, the term of this patent is extended or adjusted under 35 U.S.C. 154(b) by 409 days.

(21) Appl. No.: 10/410,232

(22) Filed: Apr. 10, 2003

(65) Prior Publication Data

US 2003/0214689 A1  Nov. 20, 2003

(30) Foreign Application Priority Data

Apr. 10, 2002 (CA) ................................ 2381375

(51) Int. Cl.
*G06F 17/00* (2006.01)

(52) U.S. Cl. ................ 235/375; 235/379; 235/487; 235/492

(58) Field of Classification Search ............ 235/379, 235/487, 491, 492, 380, 375
See application file for complete search history.

(56) References Cited

U.S. PATENT DOCUMENTS

| | | | |
|---|---|---|---|
| 4,840,344 A | 6/1989 | Moroe | |
| 4,984,779 A | 1/1991 | Iwasaki | |
| 5,237,159 A | 8/1993 | Stephens et al. | |
| 5,339,139 A | 8/1994 | Fullerton et al. | |
| 5,345,090 A | 9/1994 | Hludzinski | |
| 5,347,115 A | 9/1994 | Sherman et al. | |
| D355,437 S | 2/1995 | Reph | |
| 5,415,391 A | 5/1995 | Wong et al. | |
| 5,438,435 A | 8/1995 | Lawniczak | |
| 5,488,676 A | 1/1996 | Harding, Jr. | |
| 5,566,256 A | 10/1996 | Harding, Jr. | |
| 5,651,624 A | 7/1997 | Passer | |
| 5,789,916 A | 8/1998 | Mitchell | |
| 5,808,283 A | 9/1998 | Stanton et al. | |
| 5,865,547 A | 2/1999 | Harris et al. | |
| 5,887,865 A | 3/1999 | Ishimaru | |
| 5,997,192 A | 12/1999 | Martinez et al. | |
| 6,017,161 A | 1/2000 | Harris et al. | |
| 6,065,679 A | 5/2000 | Levie et al. | |
| 6,085,977 A * | 7/2000 | James et al. ............... 235/449 |
| 6,089,450 A | 7/2000 | Koeple | |
| 6,097,606 A | 8/2000 | Groves et al. | |
| 6,109,521 A | 8/2000 | Martinez et al. | |
| 6,126,073 A | 10/2000 | Rowlands | |
| 6,155,483 A | 12/2000 | Chupka et al. | |

(Continued)

*Primary Examiner*—Karl D. Frech

(57) ABSTRACT

An apparatus for obtaining data from a document at point of presentment. The document has a predetermined width, and the apparatus has a frame, a drive mechanism mounted on the frame, and sensors. The drive mechanism is adapted to move the document along a document path in the apparatus between a home position, at which the document is inserted into the apparatus, and an exit position, at which the document is removable from the apparatus. The drive mechanism includes a roller rotatable about a roller axis for engaging a contact portion of the document extending along the width thereof. The roller has a substantially smooth surface for supporting the contact portion. The sensors are for obtaining document data from the contact portion of the document.

19 Claims, 36 Drawing Sheets

U.S. PATENT DOCUMENTS

| | | |
|---|---|---|
| 6,257,783 B1 | 7/2001 | Hanaoka et al. |
| 6,261,008 B1 * | 7/2001 | Omura ................ 400/58 |
| 6,293,715 B1 | 9/2001 | James et al. |
| 6,296,405 B1 | 10/2001 | Brewington et al. |
| 6,299,365 B1 | 10/2001 | Harris et al. |
| 6,350,005 B1 | 2/2002 | Asai et al. |
| 6,373,511 B1 | 4/2002 | Groves et al. |
| 6,447,182 B2 | 9/2002 | Brewington et al. |
| 6,473,519 B1 * | 10/2002 | Pidhirny et al. ............ 382/140 |
| 6,523,927 B2 | 2/2003 | Asai et al. |
| 6,530,704 B2 | 3/2003 | Omura |
| 6,695,427 B2 | 2/2004 | Murata et al. |
| 6,816,608 B2 | 11/2004 | Cato |
| 2003/0037002 A1 | 2/2003 | Higgins et al. |

* cited by examiner

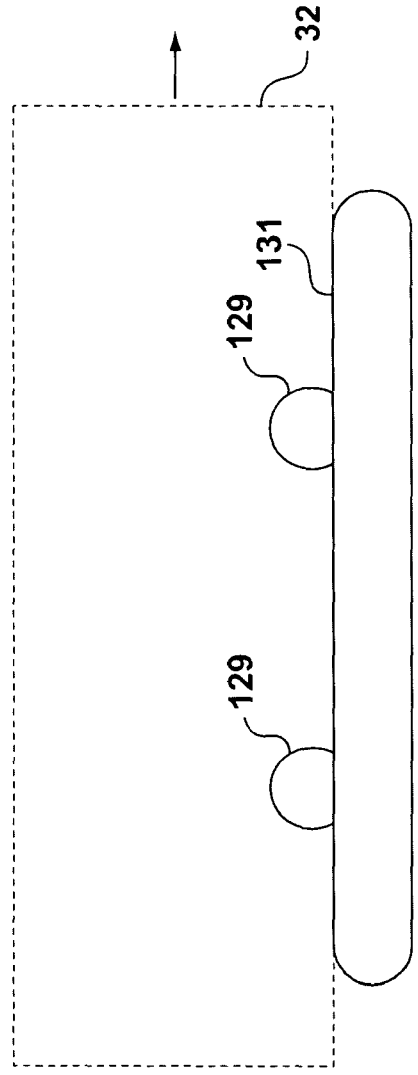
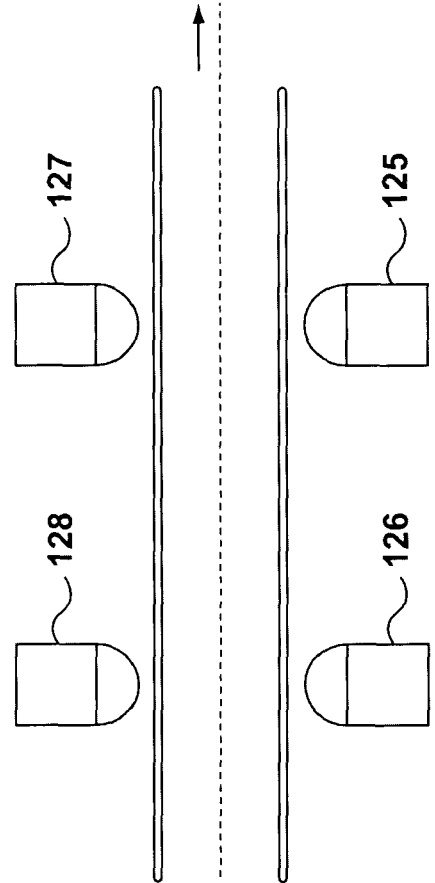
FIG. 20A
Top view
FIG. 20B
Side view perpendicular to direction of paper motion Top view Side view perpendicular to direction of paper motion

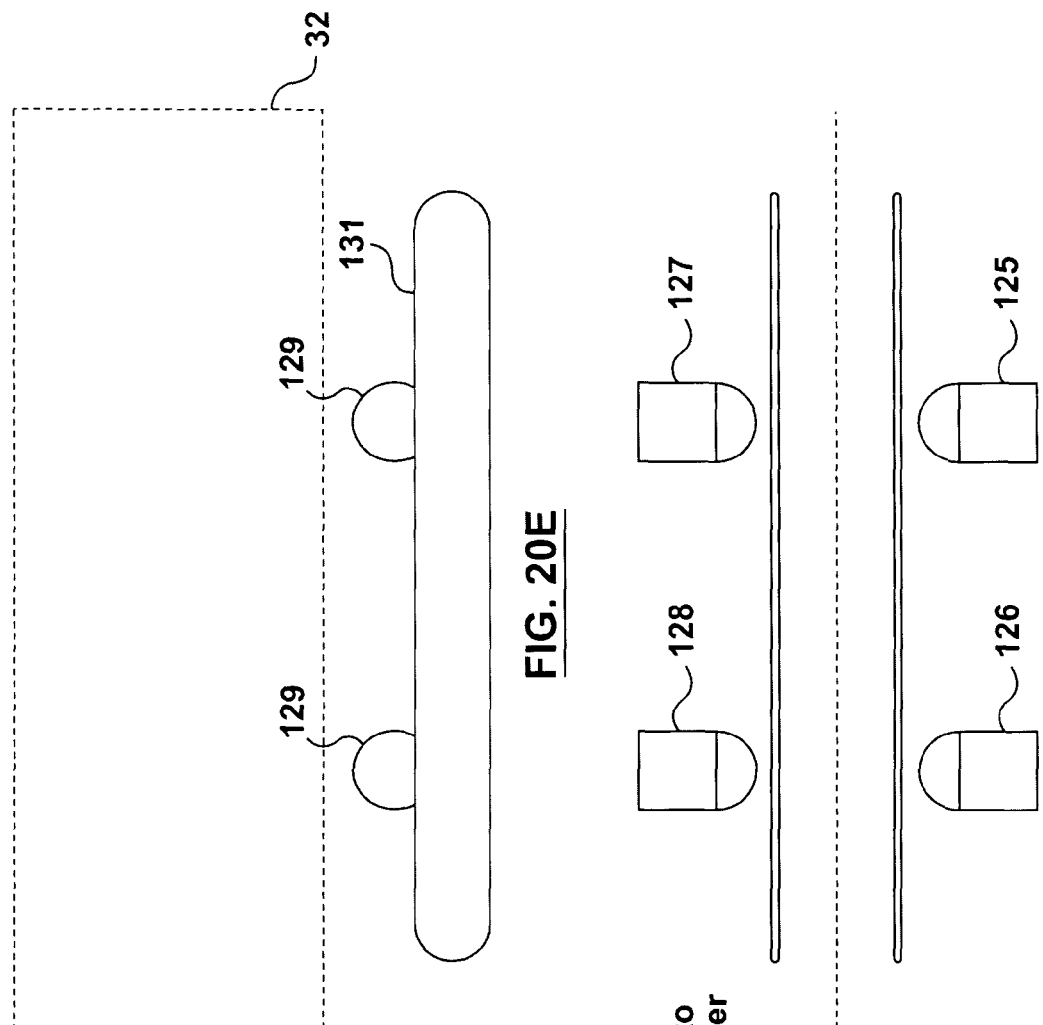

APPARATUS AND METHOD FOR OBTAINING DATA FROM A DOCUMENT

FIELD OF THE INVENTION

This invention relates to an apparatus for obtaining data from a document and more particularly, to an apparatus for obtaining data from a document at point of presentment.

BACKGROUND OF THE INVENTION

A variety of documents such as checks, bill stubs, bond coupons, and money orders are presented in various transactions in which data is obtained from the document to enable the transaction to proceed. For example, in a transaction of purchase and sale by a consumer, the consumer may present a check in payment of the amount due. A vendor may wish to convert the check at point of sale, and if so, data must be obtained from the check in order to complete the transaction. Alternatively, a customer who wishes to pay an amount due to a vendor pursuant to an invoice (or bill) typically presents a bill stub (i.e., a detachable portion of the invoice designed to be returned with payment) to the vendor or the vendor's agent. The vendor, or the vendors agent, needs to obtain data from the bill stub in order to complete the transaction.

In each of these examples, the vendor or his agent needs to obtain data from the document at point of presentment. Typically, the point of presentment is a retail context, and the consumer waits while the transaction is completed. The consumer also expects to be provided with confirmation of completion of the transaction immediately upon completion, at the point of presentment. The confirmation of completion is provided in different forms, but generally involves a receipt and/or a mark made on the document.

Known devices for obtaining data from documents suffer from a number of defects. For example, the "footprint" of a device for obtaining data from a document (i.e., the space on the vendors counter occupied by the device) should be as small as possible. However, known devices still have relatively large footprints. Also, misfeeding of documents, and jamming, is a recurring problem in known data-obtaining devices. As another example, known devices can also permit a misread document to be processed in some circumstances, with the result that the vendor is then subsequently obligated to deal with the lack of document data.

There is therefore a need for an improved apparatus for obtaining data from a document at point of presentment.

SUMMARY OF THE INVENTION

In a broad aspect of the present invention, there is provided an apparatus for obtaining data from a document having a predetermined width at point of presentment. The apparatus has a frame, a drive mechanism mounted on the frame, and a sensor. The drive mechanism is adapted to move the document along a document path in the apparatus between a home position, at which the document is inserted into the apparatus, and an exit position, at which the document is removable from the apparatus. The drive mechanism includes a roller rotatable about a roller axis for engaging a contact portion of the document extending along the width thereof. The roller has a substantially smooth surface for supporting the contact portion. The sensor is for obtaining document data from the contact portion of the document.

In another aspect, the roller includes slots positioned substantially transverse to the roller axis. The frame includes a deck portion having fingers extending from the deck portion in an inward direction of travel in the document path, the inward direction of travel being from the home position to the exit position. The fingers are received in the slots, for preventing misdirection of the document out of the document path upon engagement of the document with the roller.

In yet another aspect, the apparatus includes communication means for transmitting document data obtained by the sensor from the document to a central data processor and for transmitting a transaction decision signal from the central data processor to a drive control means controlling the drive mechanism. The document data is analyzable by the central data processor during an analysis time period. The transaction decision signal is selected from the group consisting of an approved signal end a rejected signal. Also, the drive mechanism is adapted to hold the document stationary during the analysis time period, to move the document along the document path to the exit position upon receipt of the approved signal, and to move the document along the document path to the home position upon receipt of the rejected signal.

In another alternative aspect, the apparatus includes transaction data input means for inputting transaction data associated with the document data into the apparatus. Also included are communication means for transmitting the transaction data and the document data to a central data processor and for transmitting a transaction decision signal from the central data processor to a drive control means controlling the drive mechanism. The transaction data and the document data are analyzable by the central data processor during an analysis time period. Also, the transaction decision signal is selected from the group consisting of an approved signal and a rejected signal. In addition, the drive mechanism is adapted to hold the document stationary during the analysis time period, to move the document along the document path to the exit position upon receipt of the approved signal, and to move the document along the document path to the home position upon receipt of the rejected signal.

In yet another aspect, the sensor is an imaging sensor for obtaining an image of at least a portion of the document.

In another of its aspects, the apparatus includes a MICR reader for reading MICR characters on the document to provide recognized MICR data associated with the document. The MICR reader is positioned to read said MICR characters when the document is in the document path.

In yet another aspect, the apparatus includes transaction data input means for inputting transaction data associated with the document data into the apparatus. Also, the apparatus includes communication means for transmitting the transaction data and the recognized MICR data to a central data processor and for transmitting a transaction decision signal from the central data processor to a drive control means controlling the drive mechanism. The transaction data and the recognized MICR data are analyzable by the central data processor during an analysis time period. The transaction decision signal is selected from the group consisting of an approved signal and a rejected signal. Also, the drive mechanism is adapted to hold the document stationary during the analysis time period, to move the document along the document path to the exit position upon receipt of the approved signal, and to move the document along the document path to the home position upon receipt of the rejected signal.

In yet another aspect, the apparatus includes a stamping mechanism for marking the document after the approved signal has been transmitted to the apparatus.

In an alternative aspect, the stamping mechanism is adapted to mark the document as the document is moved along the document path towards the exit position after the approved signal has been received by the drive control means.

In another alternative aspect, the imaging sensor is a contact image sensor positioned in a contact image sensor housing mounted to the frame. The contact image sensor is adapted to obtain an image of the document along an image plane. The contact image sensor housing is positioned to press the document against the roller surface at a tangent point at the top of the roller. The contact image sensor is located such that the image plane is positioned a predetermined distance downstream in an inward direction of travel in the document path from the tangent point, the inward direction being from the home position to the exit position.

In another alternative aspect, the invention provides a cartridge for use in a stamping mechanism included in an apparatus for, obtaining data from a document. The apparatus has a frame and a cartridge chassis attached to the frame, a drive mechanism mounted on the frame, and a document path along which the document is movable by the drive mechanism. The cartridge includes a cartridge body adapted to be attached to the cartridge chassis. The cartridge is positionable on the cartridge chassis. The cartridge includes a stamp portion. The cartridge is adapted to be moved by an actuator. The actuator is adapted to move the cartridge between an actuated position, in which the stamp portion contacts the document to stamp the document, and an unactuated position, in which the stamp portion is maintained spaced apart from the document.

In another alternative aspect, the invention provides a method of obtaining an image of at least a portion of a document at point of presentment, the document having a predetermined width. The method includes the steps of providing an apparatus having a document path, inserting the document in the document path, providing imaging means positioned adjacent to a contact portion of the document, and capturing the image of at least part of the contact portion of the document by operating said imaging means.

In yet another aspect, the invention provides an apparatus for conversion of a check in a transaction at point of sale, the check having a predetermined width. The apparatus has a frame, a drive mechanism mounted on the frame, and a sensor. The senor is for obtaining document data from the contact portion of the check. The drive mechanism is adapted to move the document along a document path in the apparatus. Also, the drive mechanism includes a roller rotatable about a roller axis for engaging at least a contact portion of the check extending along the width thereof. The roller has a substantially smooth surface for supporting the contact portion.

In an alternative aspect, the apparatus includes a MICR reader for reading MICR characters on the check to provide account data relating to an account on which the check is drawn.

In yet another aspect, the apparatus includes transaction data input means for inputting transaction data associated with the transaction into the apparatus. The apparatus also includes communication means for transmitting the document data and the transaction data to a central data processor and for transmitting a transaction decision signal from the central data processor to a drive control means controlling the drive mechanism. In addition, the transaction data and the document data are analyzable by the central data processor during an analysis time period. The transaction decision signal is selected from the group consisting of an approved signal and a rejected signal. Also, the drive mechanism is adapted to hold the document stationary during the analysis time period, to move the document along the document path to the exit position upon receipt of the approved signal and to move the document along the document path to the home position upon receipt of the rejected signal.

BRIEF DESCRIPTION OF THE DRAWINGS

The invention will be better understood with reference to the drawings, in which:

FIG. 20A is a schematic diagram representing the input guide means when the document is properly aligned therein;

FIG. 20B is a schematic diagram representing the input guide means when the document is properly aligned therein;

FIG. 20E is a schematic diagram representing the input guide means when the document is misaligned therein:

FIG. 20F is a schematic diagram representing the input guide means when the document is misaligned therein;

DETAILED DESCRIPTION OF THE PREFERRED EMBODIMENT(S)

Figure 3:
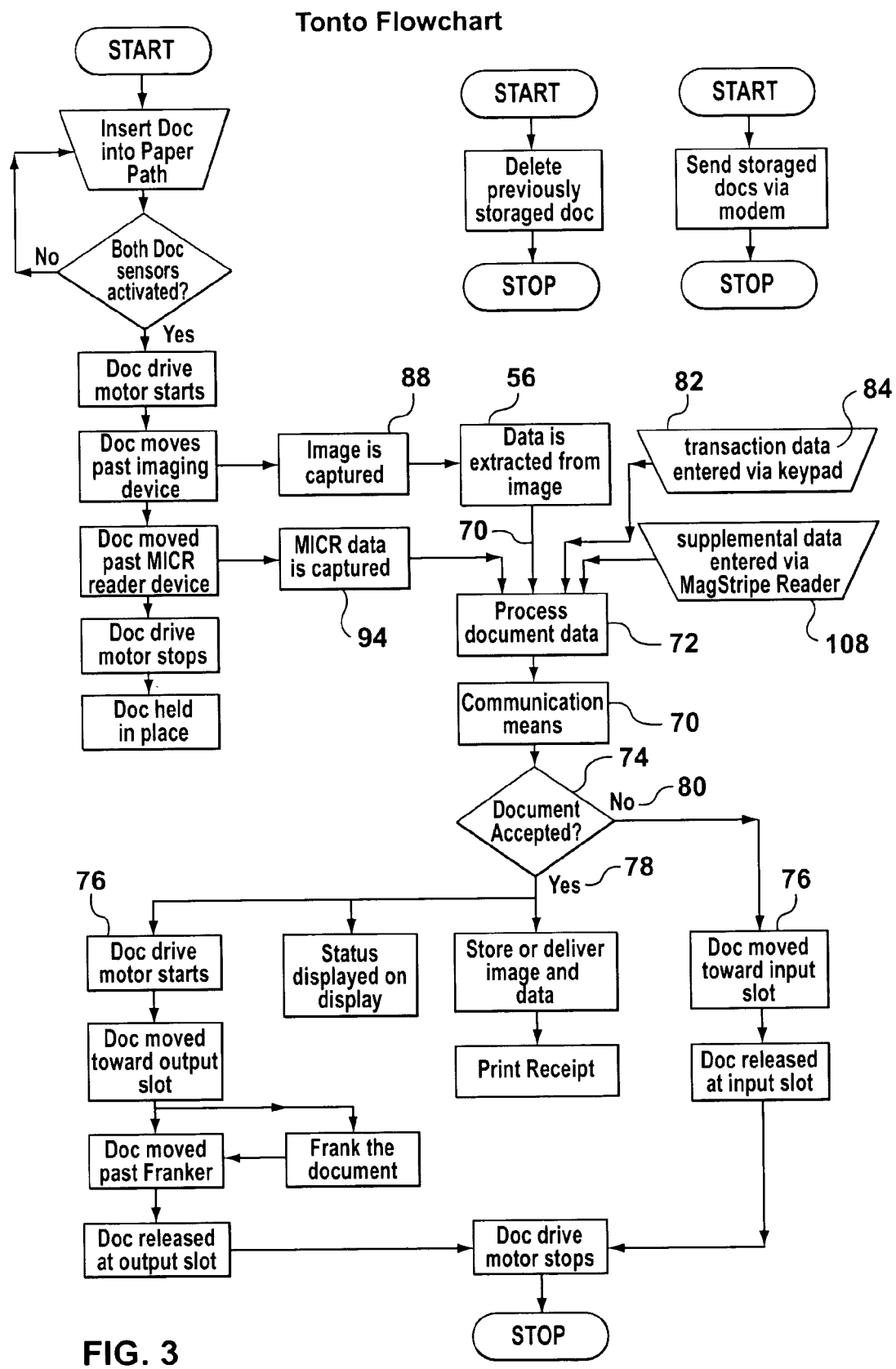
FIG. 3 is a flowchart diagram representing a method of obtaining data from a document in accordance with the present invention.
Figure 4:
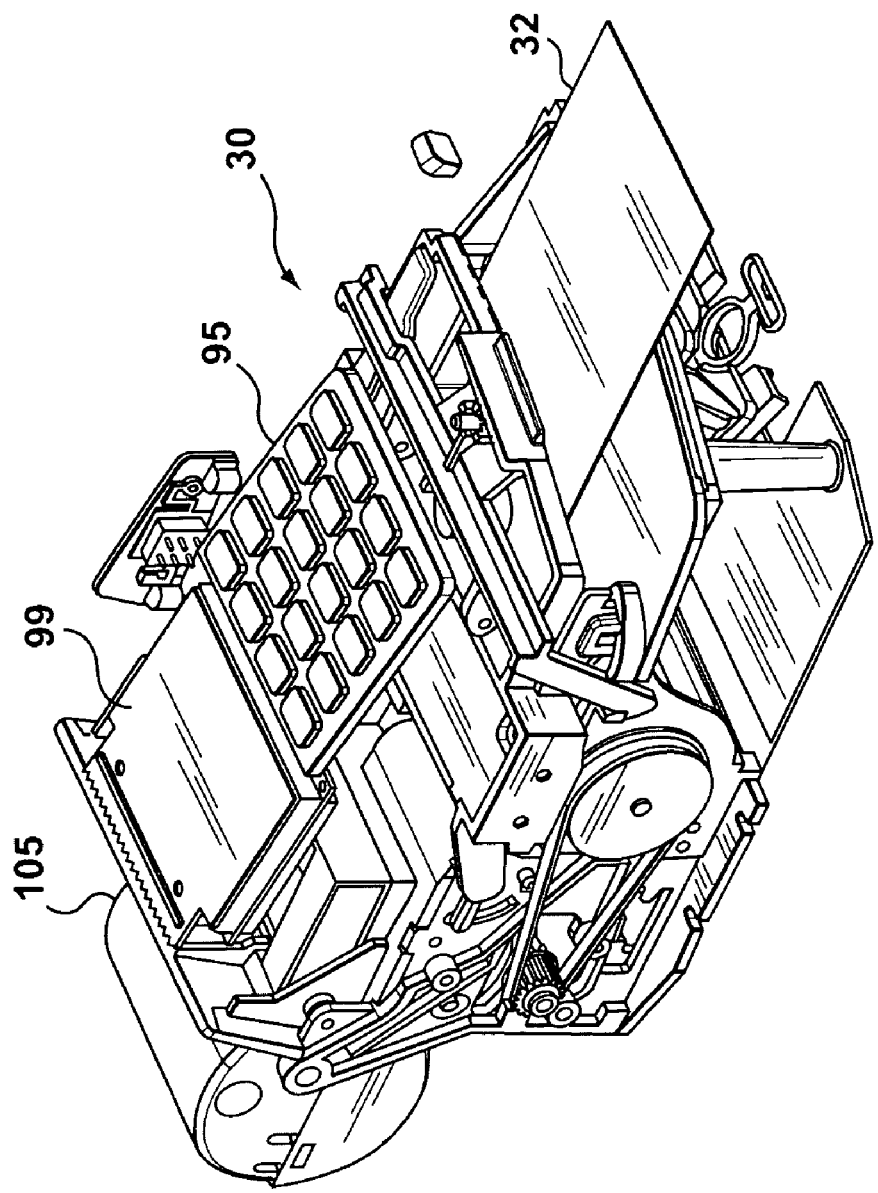
FIG. 4 is an isometric view of the apparatus of FIG. 1B with the cover removed.
Figure 4A:
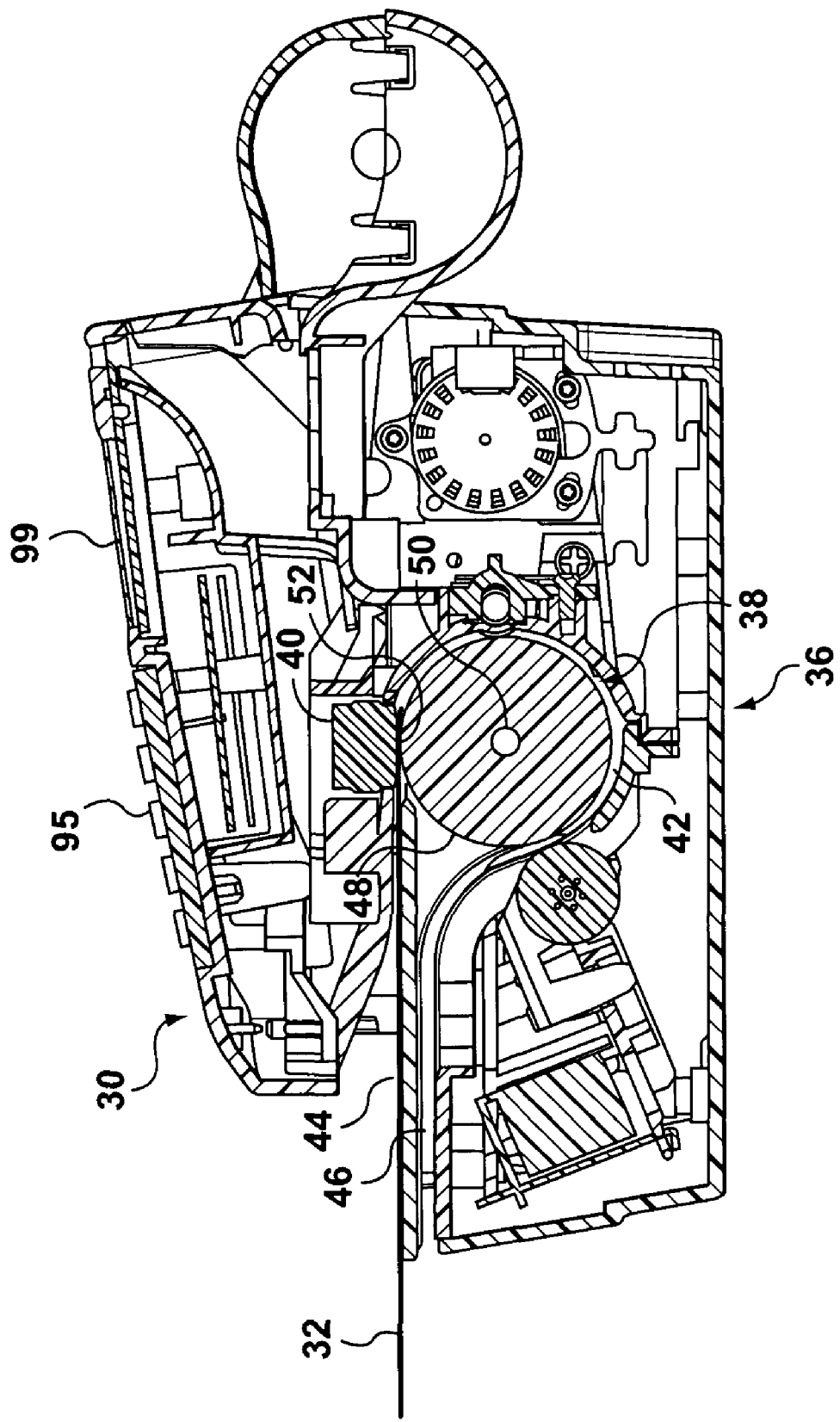
FIG. 4A is a side view cross-section of the apparatus of FIG. 4.
Figure 5:
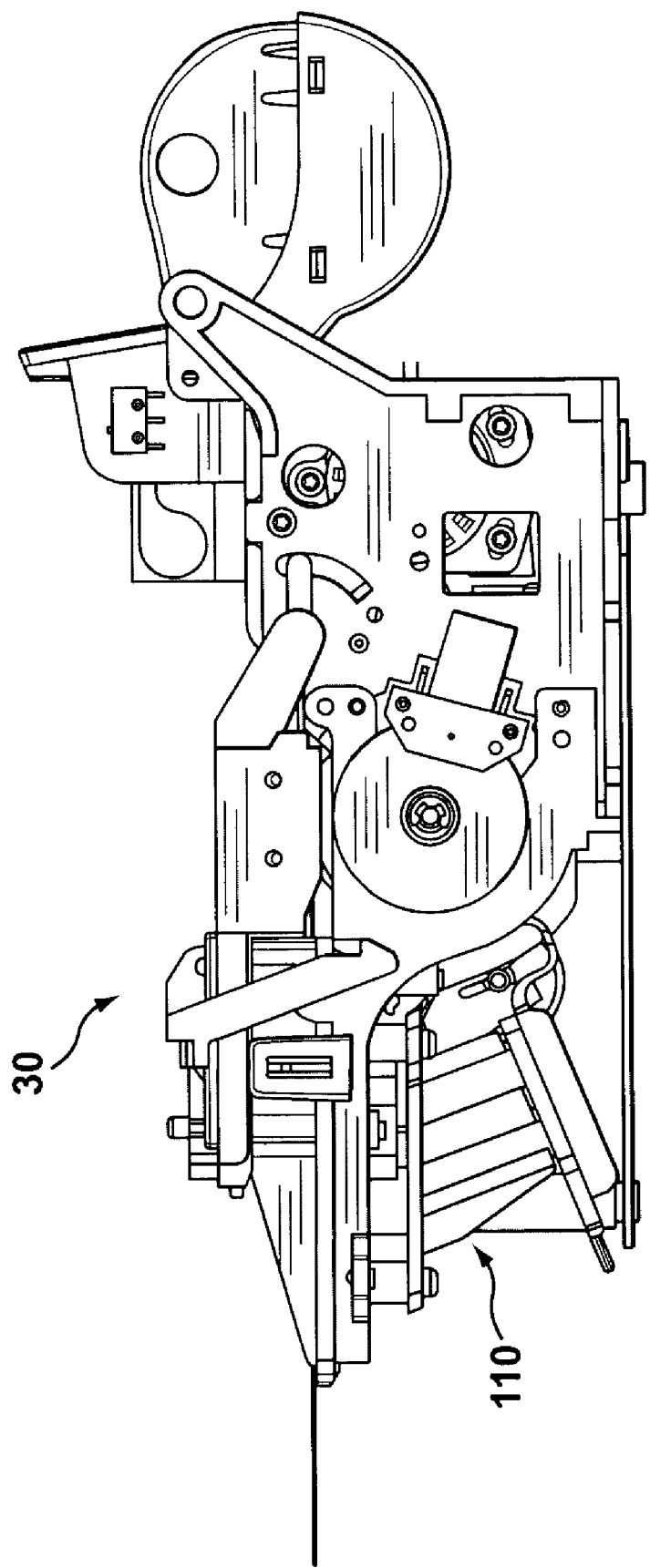
FIG. 5 is a side view of the apparatus of FIG. 4, drawn at a larger scale, with the keypad assembly and the display screen removed.
Figure 6:
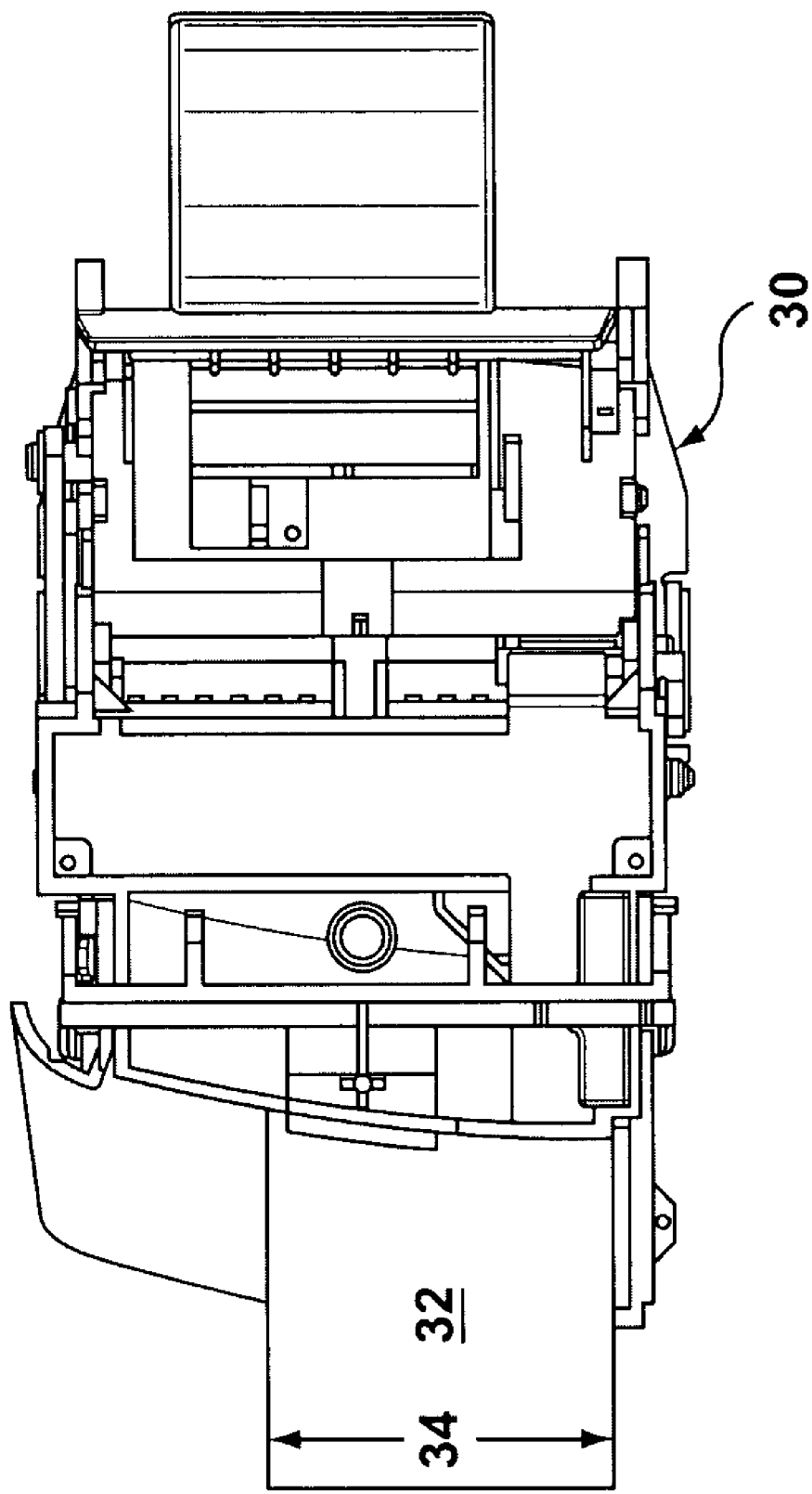
FIG. 6 is a top view of the apparatus of FIG. 5, drawn at a smaller scale.
Figure 6A:
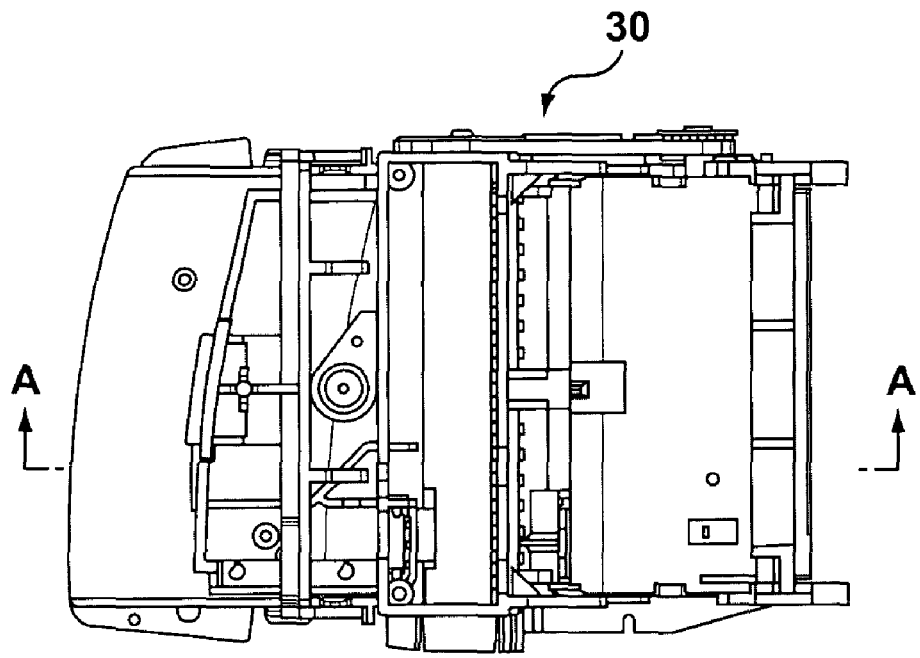
FIG. 6A is a top view of the apparatus of FIG. 6, drawn at a smaller scale, showing line A—A.
Figure 6B:
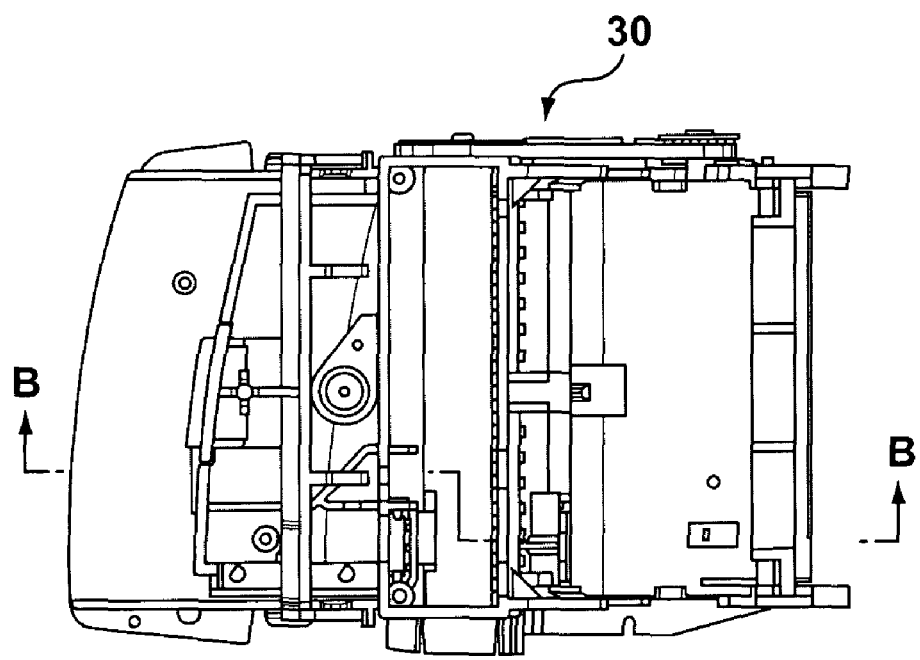
FIG. 6B is a top view of the apparatus of FIG. 6, drawn at a smaller scale, showing line B—B.

Reference is first made to FIGS. 1B, 3, 4, and 4A to describe a preferred embodiment of an apparatus for obtaining data from a document at point of presentment indicated generally by the numeral 30 in accordance with the invention. The apparatus 30 is for obtaining data from a document 32 having a predetermined width dimension 34 (FIG. 4) at point of presentment of the document 32, as will be described. As can be seen in FIG. 4A, the apparatus 30 has a frame 36, a drive mechanism 38 mounted on the frame 36, and a sensor 40 for obtaining document data. As will be described, the drive mechanism 38 is for moving the document 32 along a document path 42 in the apparatus 30 between a home position 44 and an exit position 46 (FIG. 4A). In the preferred embodiment, the document 32 is inserted into the apparatus 30 at the home position 44 (FIG. 4). The document 32 is removable from the apparatus 30 at the exit position 46. As can be seen in FIG. 4A, the drive mechanism 38 includes a roller 48 rotatable about a roller axis 50 for engaging a contact portion 52 of the document extending along the width 34 of the document 32. Also, the roller 48 has a substantially smooth surface 54 for supporting the contact portion 52, as will be described. The sensor 40 obtains document data 56 (FIG. 3) from the contact portion 52 of the document 32, as will also be described.

Figure 21:
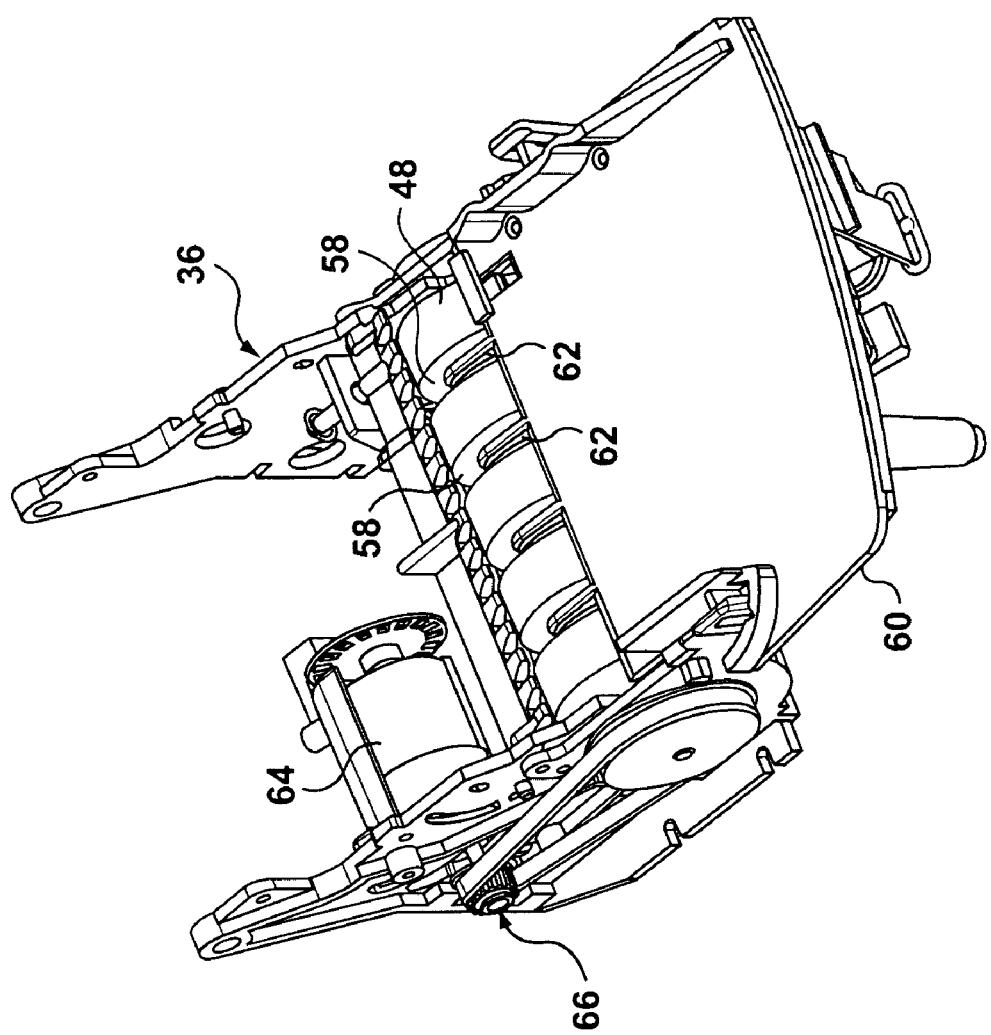
FIG. 21 is an isometric view of the frame of FIG. 16 and the input guide means with the contact image sensor housing removed, showing a slotted roller, drawn at a smaller scale.

As can be seen in FIG. 21, the roller 48 includes a plurality of slots 58 positioned substantially transverse to the roller axis 50. The frame 36 includes a deck portion 60 having fingers 62 extending from the deck portion 60 in an inward direction of travel in the document path 42 in the direction of arrow A (FIG. 21). Each finger 62 is received in each slot 58 for preventing misdirection of the document 32 out of the document path 42 upon engagement of the document 32 with the roller 48.

Figure 7:
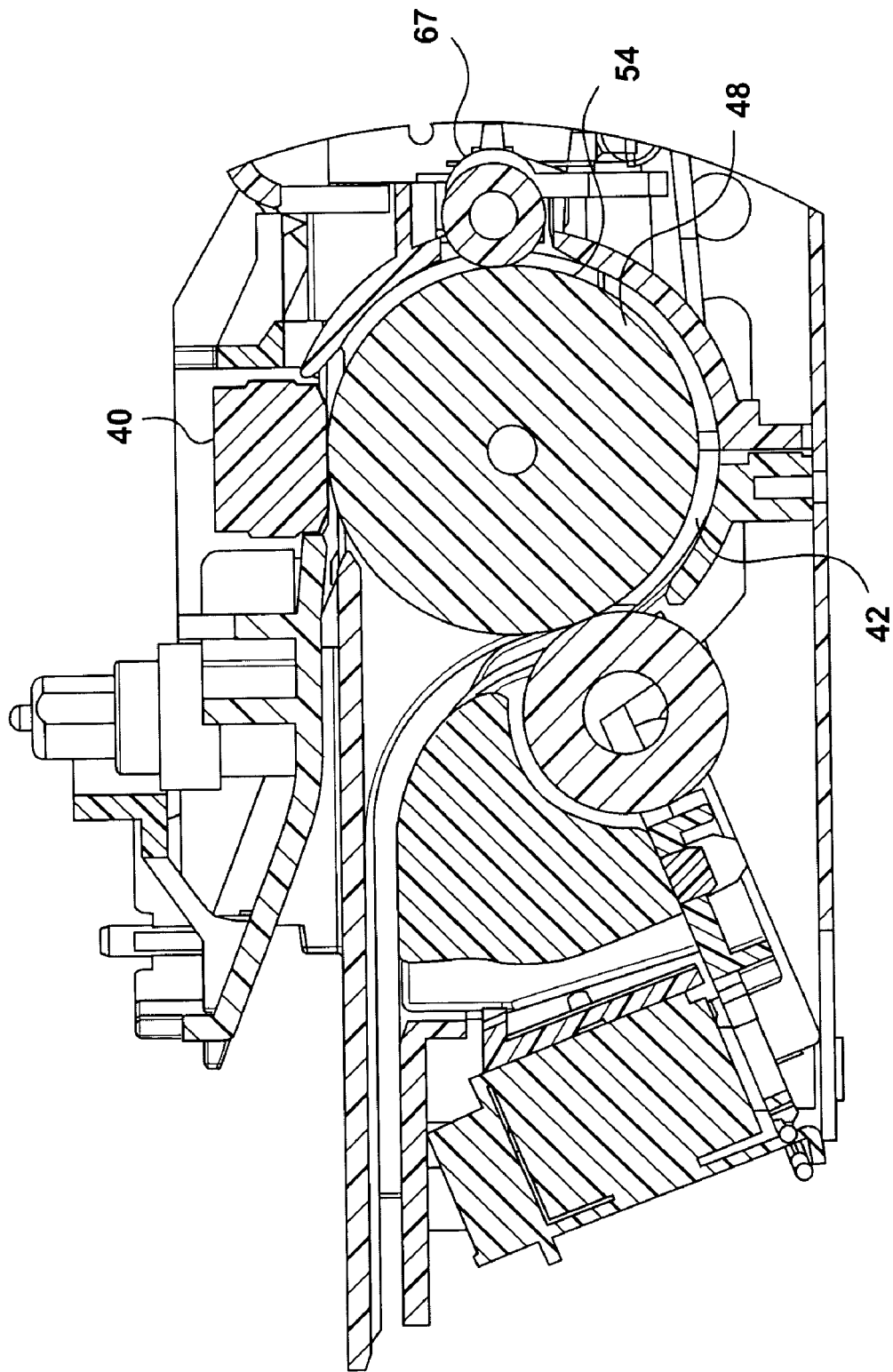
FIG. 7 is a cross-section taken along line A—A showing a document path in the apparatus, drawn at a larger scale.
Figure 22:
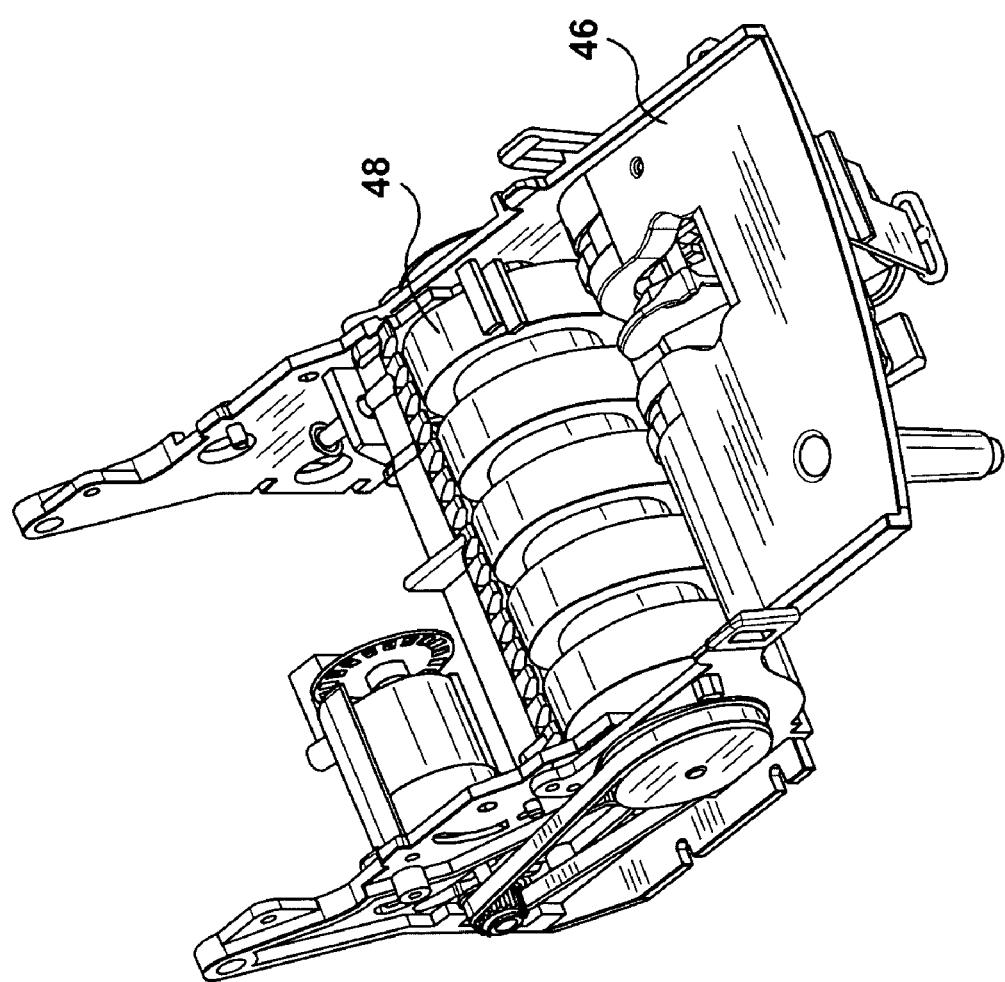
FIG. 22 is an isometric view of the frame of FIG. 21 with the input guide means removed, showing an exit guide means.

The frame 36 with the deck portion 60 removed is shown in FIG. 22. As shown in FIGS. 21 and 22, the drive mechanism 38 includes a motor 64 and drive assembly 66 which drive the roller 48 about its axis 50. The motor 64 and the drive assembly 66 are any suitable motor and drive assembly arrangement, and preferably are of conventional construction, as is known in the art. Preferably, an idler 67 is positioned to press the document 32 tightly against the roller surface 54 (FIG. 7).

It will be appreciated that the roller 48 is considered, for the purposes hereof, as 2 single roller, notwithstanding the plurality of slots 58 therein. As will be described, the use of a single roller, i.e., a roller extending across the width 34 of the document 32, provides for a number of advantages over known devices used for obtaining data from documents.

Preferably, the apparatus 30 is adapted to process a variety of documents having a wide range of document widths. As can be seen in FIG. 1B, for example, the apparatus 30 is capable of accepting a document having a width larger than the width 34 of the document 32.

Figure 11:
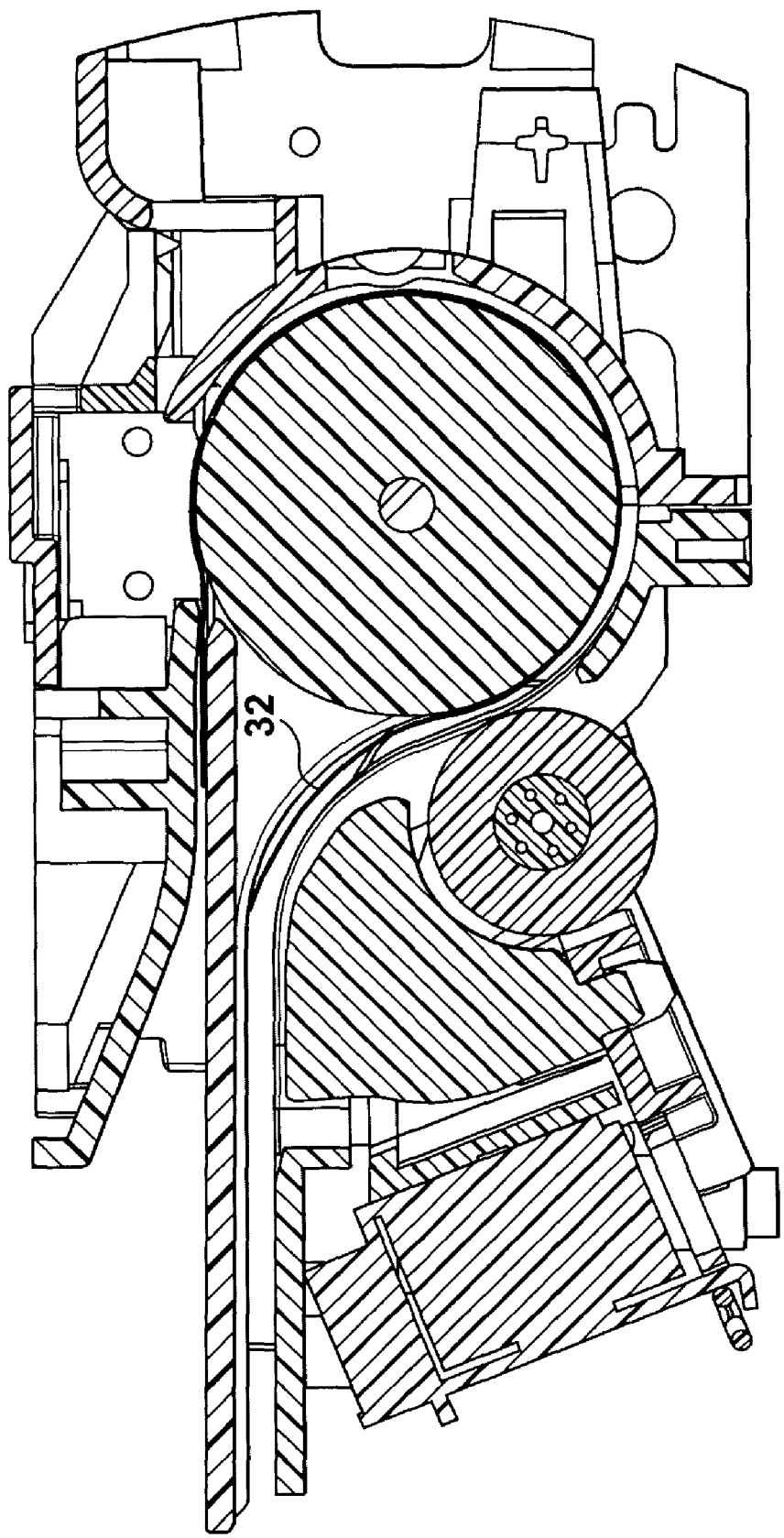
FIG. 11 is a cross-section taken along line A—A showing the document located adjacent to an unactuated stamping mechanism.
Figure 14:
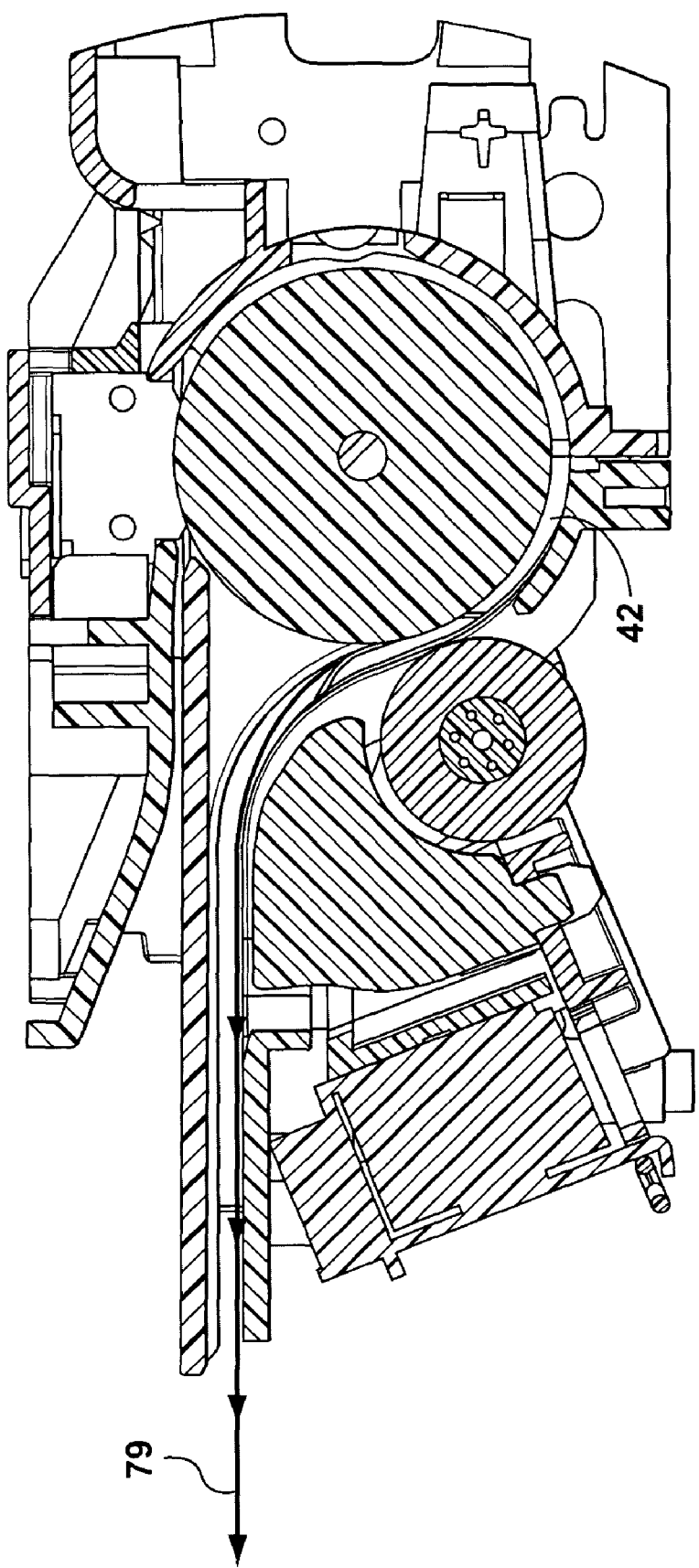
FIG. 14 is a cross-section taken along line A—A showing an acceptance path in the document path.
Figure 15:
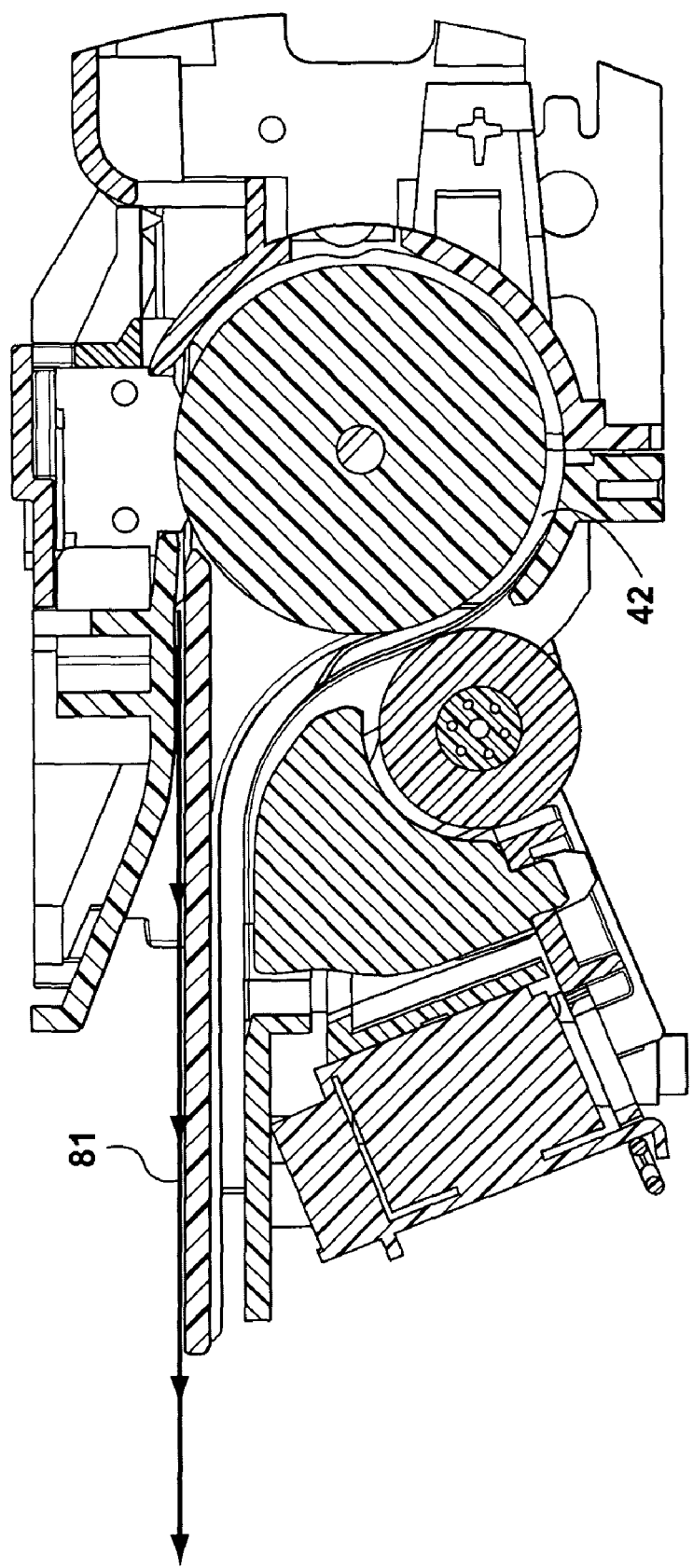
FIG. 15 is a cross-section taken along line A—A showing a rejection path in the document path.

In the preferred embodiment, the apparatus 30 includes communication means 70 for transmitting document data 56 obtained by the sensor 40 to a central data processor 72 (FIG. 3). The communication means 70 also transmits a transaction decision signal 74 from the central data processor 72 to a drive control means 76 controlling the drive mechanism 38. The data 56 from the document is analyzable by the central data processor 72 during an analysis time period. The transaction decision signal 74 is either an approved signal 78 or a rejected signal 80 (FIG. 3). The drive mechanism 38 is adapted to hold the document 32 stationary during the analysis time period (FIG. 11). After the analysis time period, upon the receipt by the drive control means 76 of the approved signal 78, the drive mechanism 38 moves the document 32 along an acceptance path 79 (FIG. 14) in the document path 42 to the exit position 46. Alternatively, upon the receipt by the drive control means 76 of the rejected signal 80, the drive mechanism 38 moves the document 32 along a rejected path 81 (FIG. 15) in the document path 42 to the home position 44.

Figure 8:
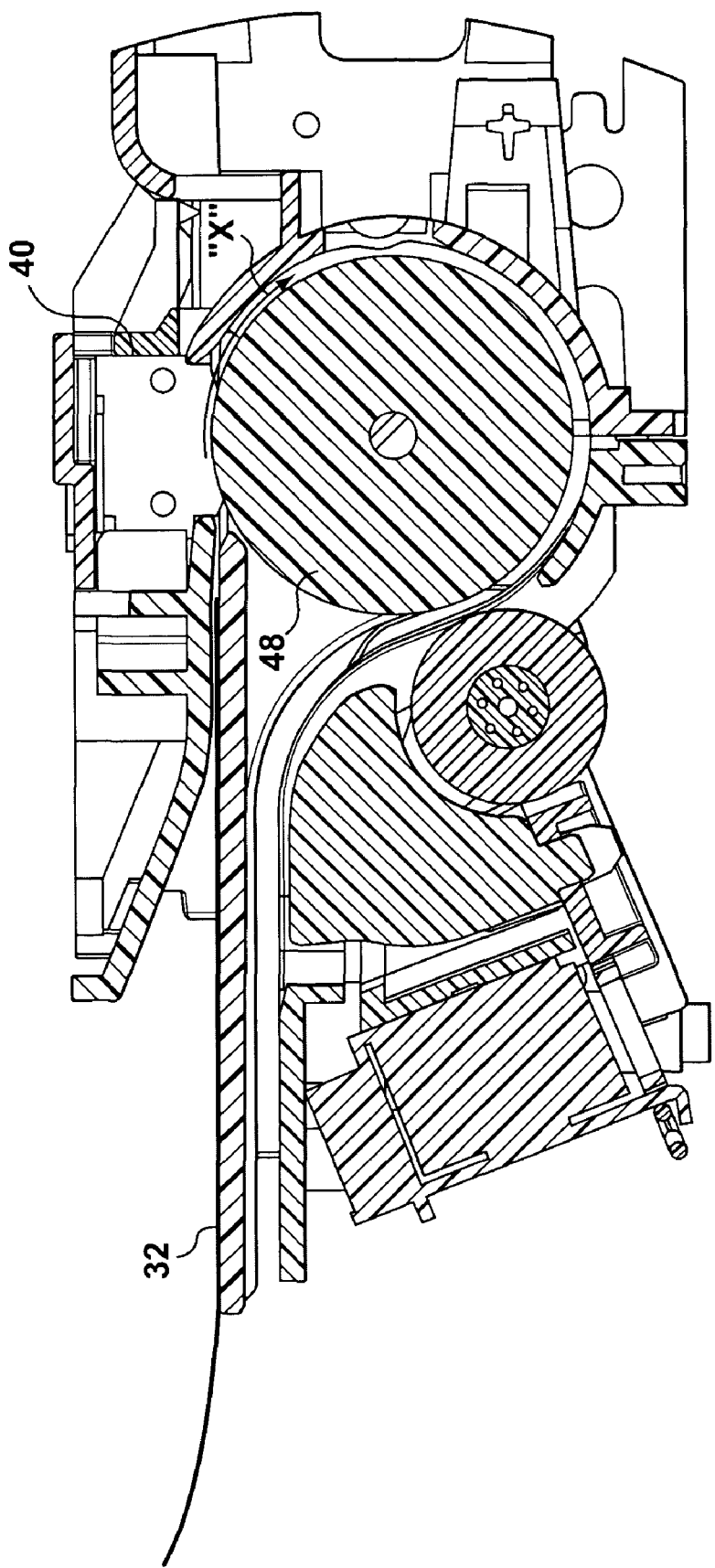
FIG. 8 is a cross-section taken along line A—A showing the document located at a home position in the document path.
Figure 9:
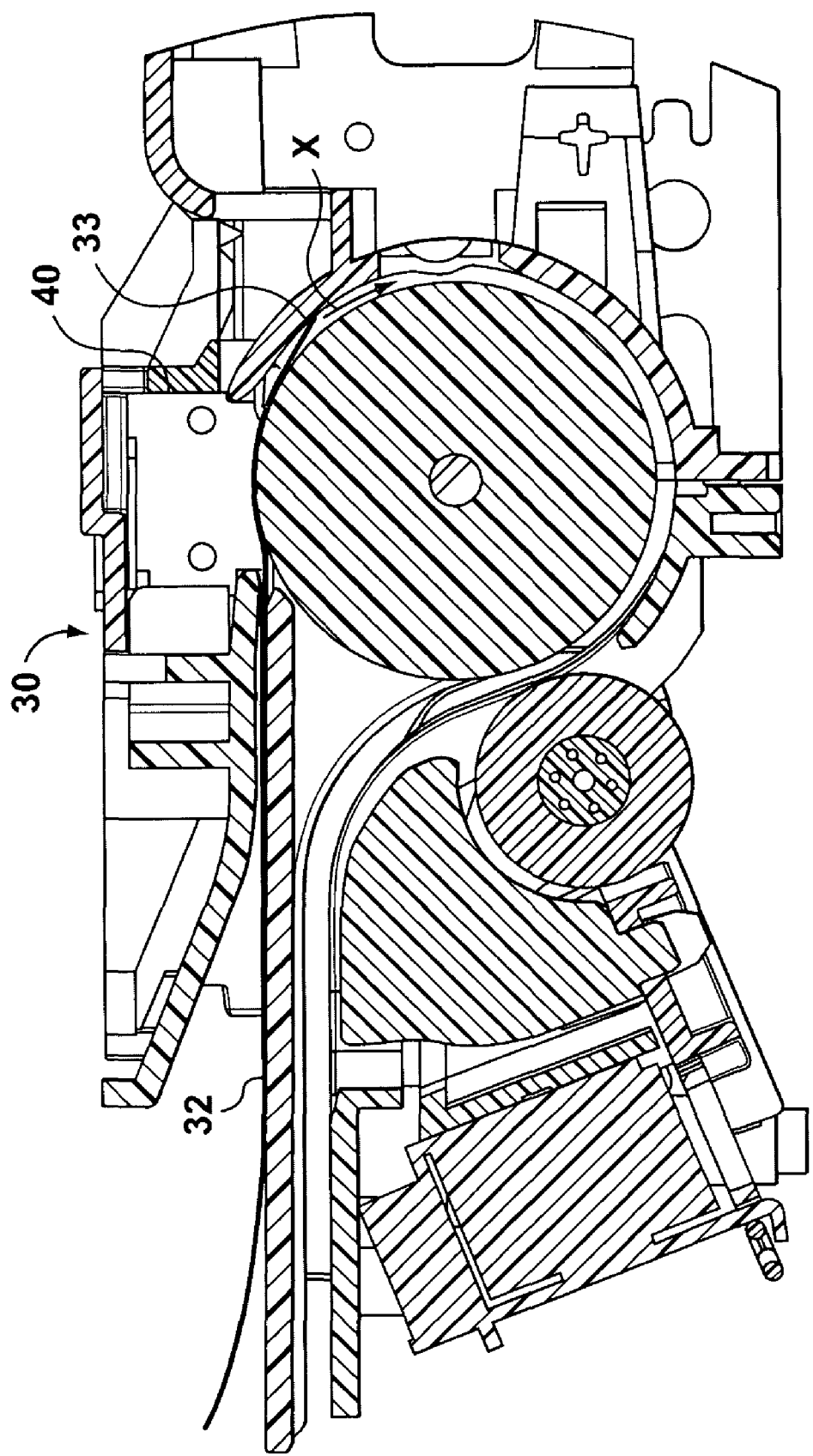
FIG. 9 is a cross-section taken along line A—A showing the document located adjacent to an image sensor.
Figure 10:
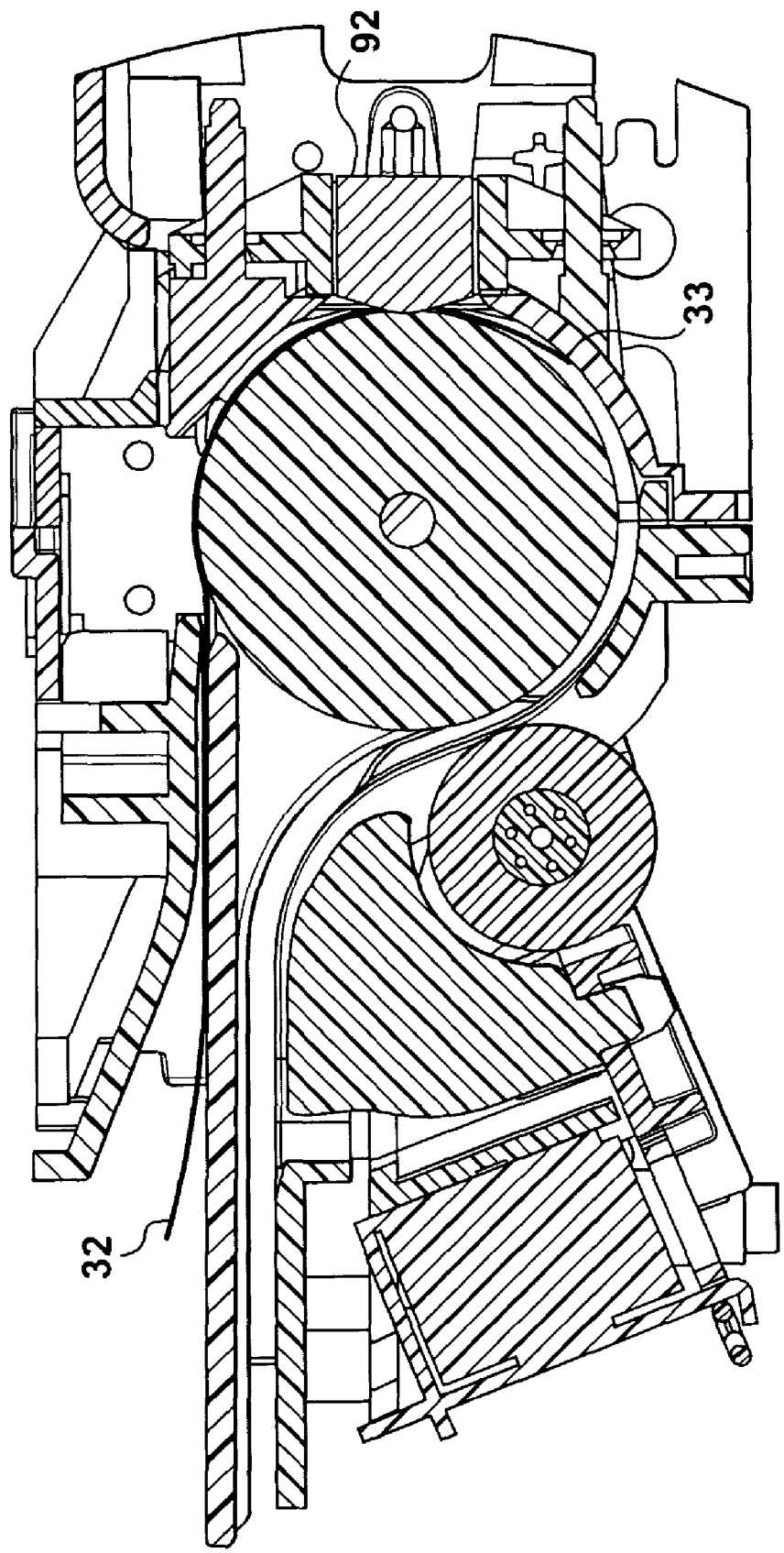
FIG. 10 is a cross-section taken along line B—B showing the document located adjacent to the MICR reader.
Figure 12:
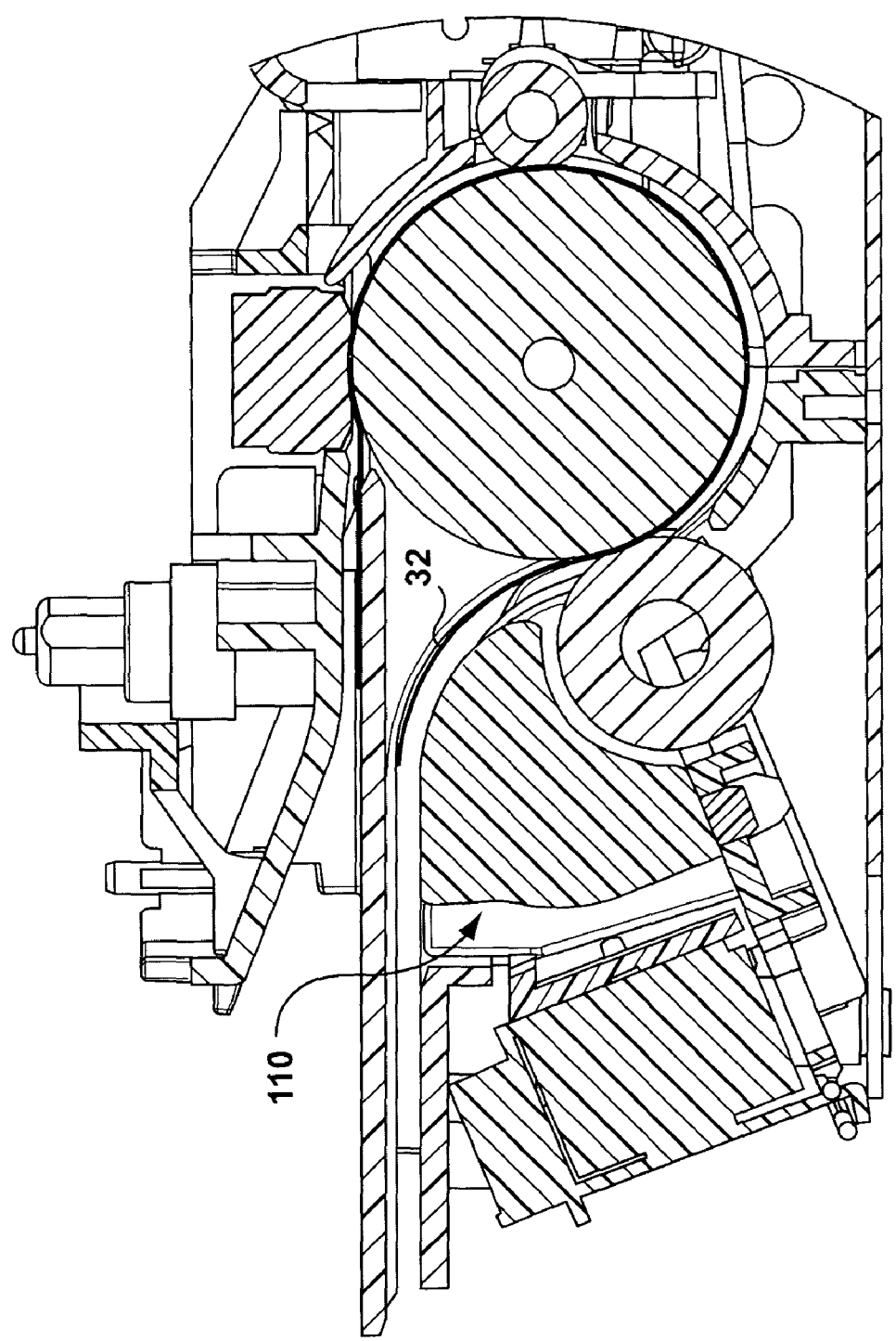
FIG. 12 is a cross-section taken along line A—A showing the document located adjacent to an actuated stamping mechanism.
Figure 13:
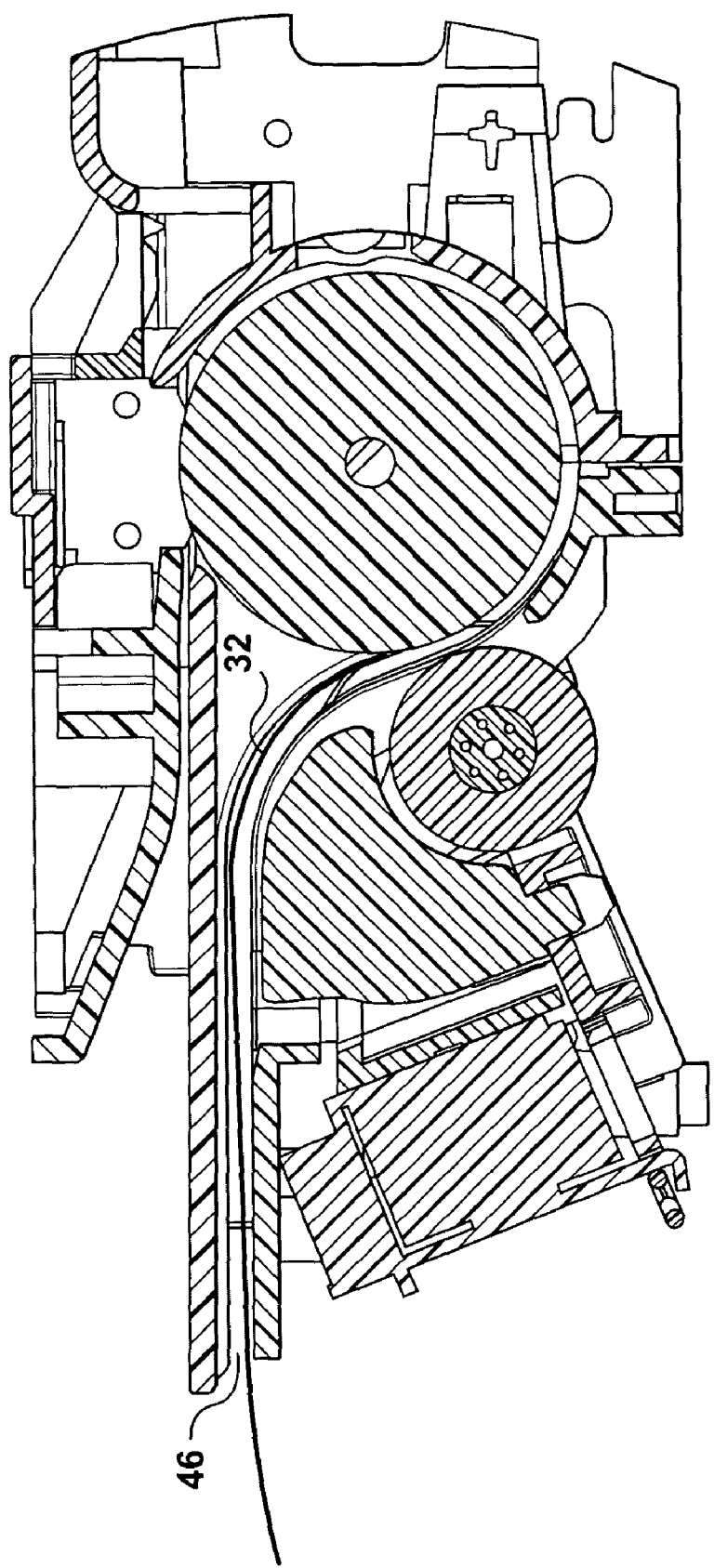
FIG. 13 is a cross-section taken along line A—A showing the document located in an exit position.
Figure 13A:
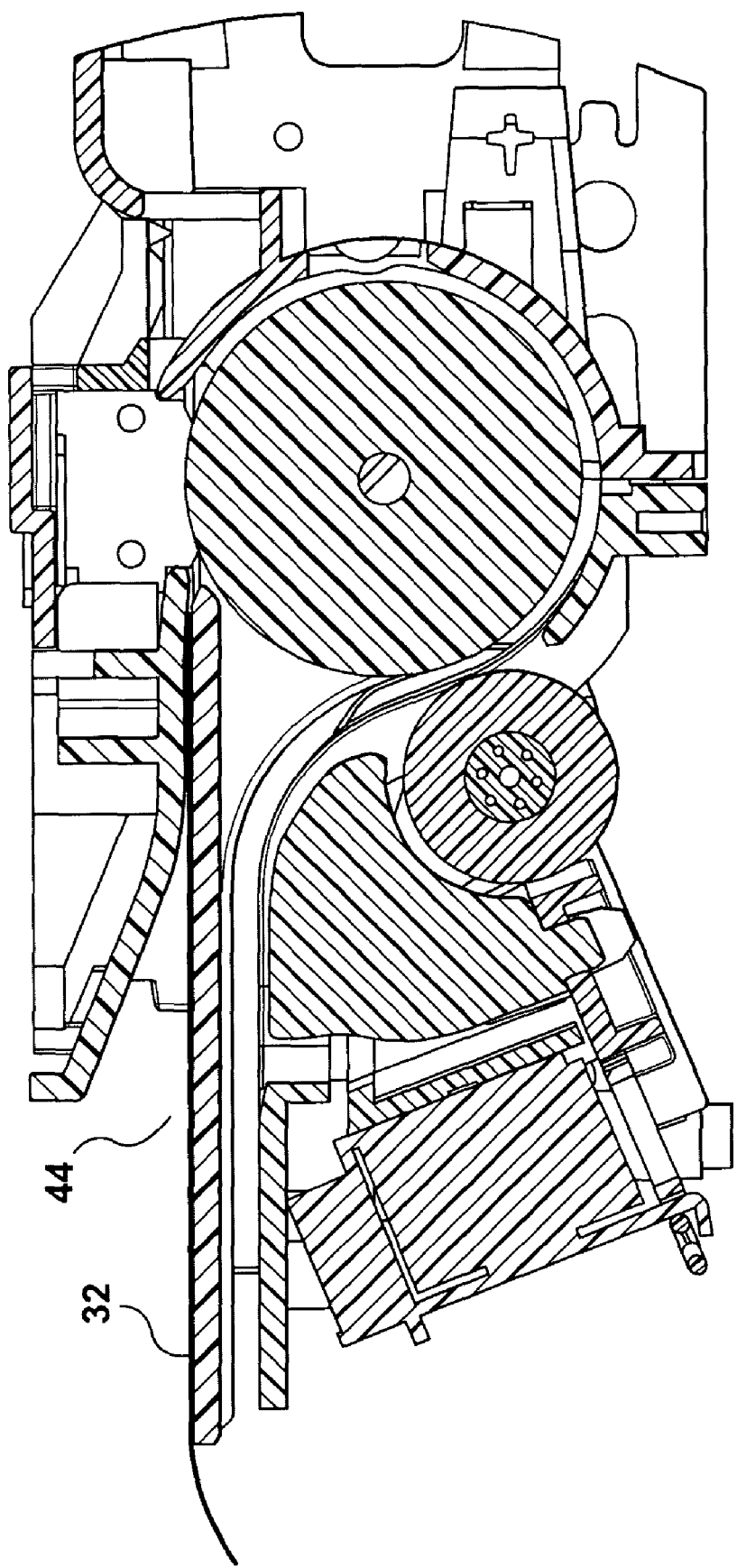
FIG. 13A is a cross-section taken along line A—A showing the document located in the home position.

Referring to FIG. 8, the document 32 is shown in the home position 44. In FIG. 9, the document 32 has been moved into the document path 42, so that a leading edge 33 has moved in an inward direction (shown by the arrow "X" in FIG. 9) and has moved passed the sensor 40. In FIG. 10, the document 32 is shown as having moved further in the inward direction, so that the leading edge 33 is past a MICR reader 92. The document 32 is moved in the inward direction until the document 32 is in the position in the document path shown in FIG. 11. The document 32 is held stationary in the document path 42 as shown in FIG. 11 during the analysis time period. In FIG. 12, an approved signal 78 has been received, and the document 32 is to be moved along the accepted path 79. FIG. 13 shows the document 32 which has been moved along the accepted path 79 to the exit position 46. FIG. 13A shows a document moved along the rejected path 81 and located in the home position 44.

Preferably, the apparatus 30 also includes transaction data input means 82 for inputting transaction data 84 associated with the document data 56 into the apparatus 30. The communication means 70 transmits transaction data 84 and document data 56 to the central data processor 72. The central data processor 72 analyzes the transaction data 84 and the document data 56 and generates the transaction decision signal 74 resulting from the analysis. For example, and as will be described, the document 32 can be a check 86 (FIG. 28), and the document data 56 can be information identifying the bank account on which the check 86 is drawn. The central data processor 72 in this example would compare the amount of the transaction and the balance in the relevant bank account. The transaction decision signal 74 is an approved signal 78 if there are sufficient funds in the relevant bank account, and the transaction decision signal 74 is a rejected signal 80 if there are insufficient funds available in the relevant bank account.

In the preferred embodiment, the sensor 40 is an imaging sensor for obtaining an image 88 of the document 32. The sensor 40 could be any suitable sensor, such as, for example, a non-contact sensor, a reduction sensor, or a contact sensor. Preferably, the sensor 40 is a contact image sensor. It will be appreciated that the sensor 40 is capable of recognizing information from the document 32 so that certain data (for example, a customer account number on an invoice) can be extracted and used in the apparatus 30.

Figure 28:
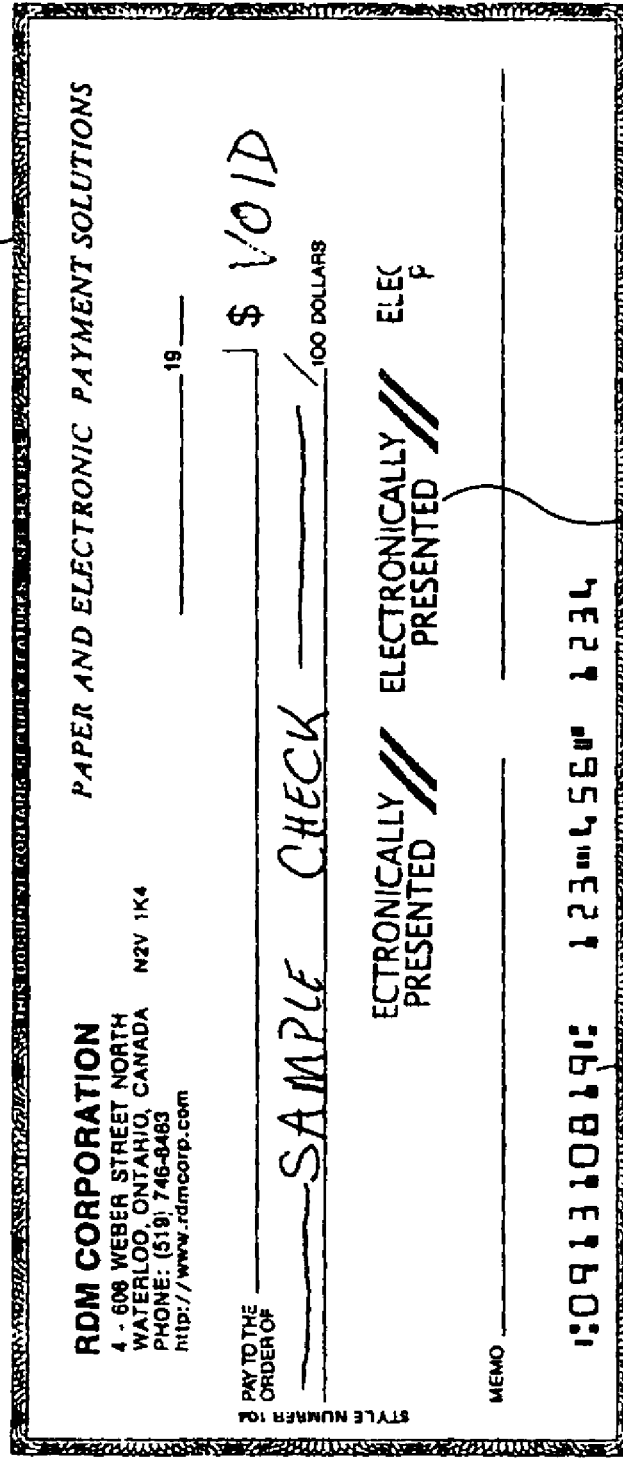
FIG. 28 is a sample of a document stamped by the stamp mechanism of the apparatus, drawn at a smaller scale.

Documents 32 such as checks 86 include magnetic ink character recognition (MICR) characters 90 (FIG. 28). The preferred embodiment of the apparatus 30 also includes the MICR reader 92 for reading MICR characters 90 on the document 32. The MICR reader 92 provides recognized MICR data 94 (FIG. 3) associated with the document 32. Preferably, the MICR reader 92 is positioned to read the MICR characters 90 on the document 32 when the document 32 is in the document path 42, as can be seen in FIG. 10.

It will be appreciated by those skilled in the an that MICR characters 90 can be recognized using other means. For example, the image sensor 40, using optical character recognition, could be used. The image data could be subjected to OCR algorithms, to result in recognized MICR data 94.

Figure 2A:
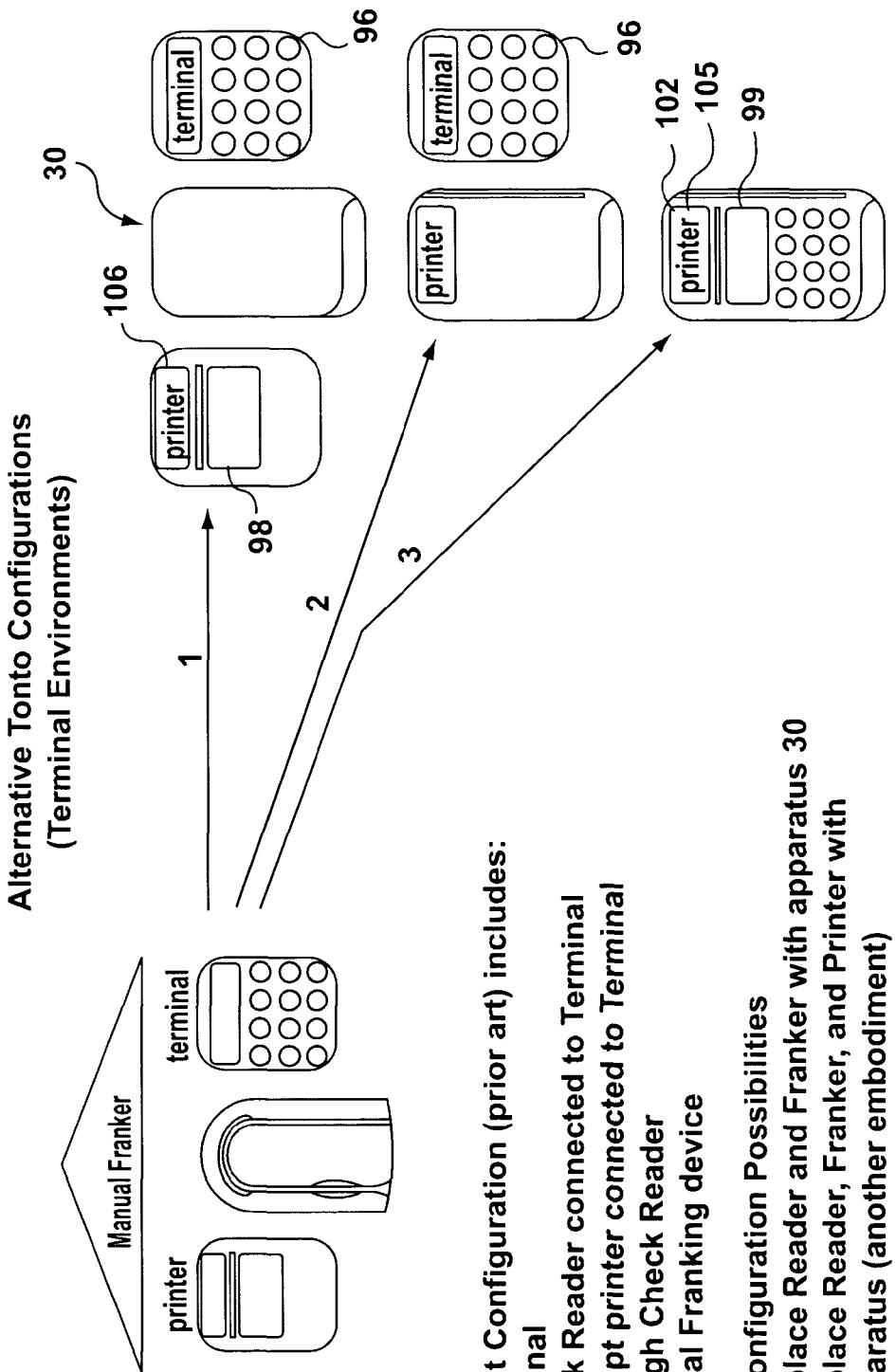
FIG. 2A is a schematic diagram representing a configuration including a prior art device and a variety of configurations including the apparatus of the invention.
Figure 2B:
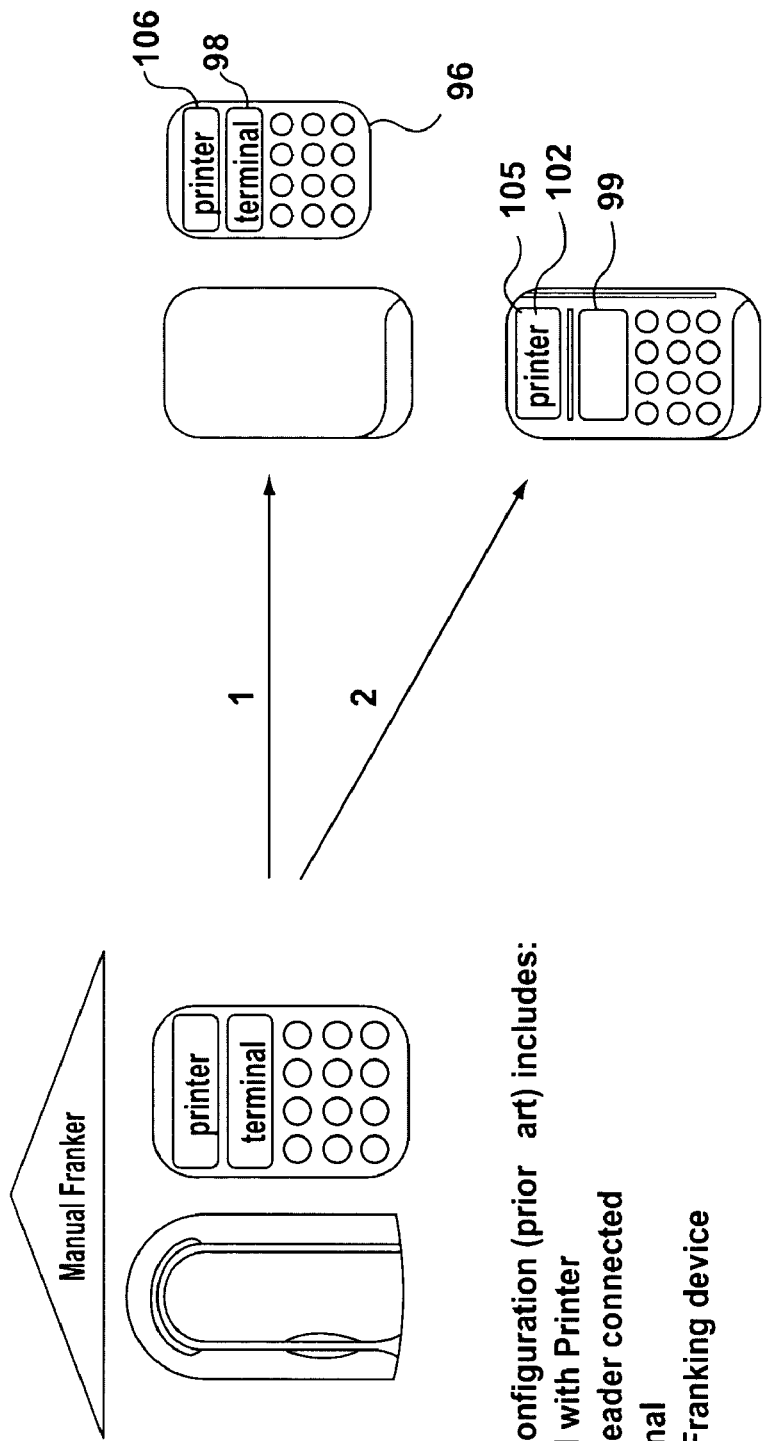
FIG. 2B is a schematic diagram representing a configuration including a prior art device and a variety of configurations including the apparatus of the invention.

As shown in FIG. 2A, the transaction data input means 82 could be an integrated keypad assembly 95, or a cash register or an external host 96 (FIGS. 2A, 2B) operably connected to the apparatus 30. Preferably, the apparatus includes the integrated keypad assembly 95, as shown in FIGS. 4 and 4A. It will be appreciated that the apparatus 30 could be used in a wide variety of configurations, as shown in FIGS. 2A and 2B.

It is also preferred that the apparatus 30 includes a display means 98, adapted to display at least part of the image 88. As shown schematically in FIG. 2A, the display means 98 could be an integrated display screen 90 or a display screen on a cash register or other terminal operably connected to the apparatus 30.

Figure 27:
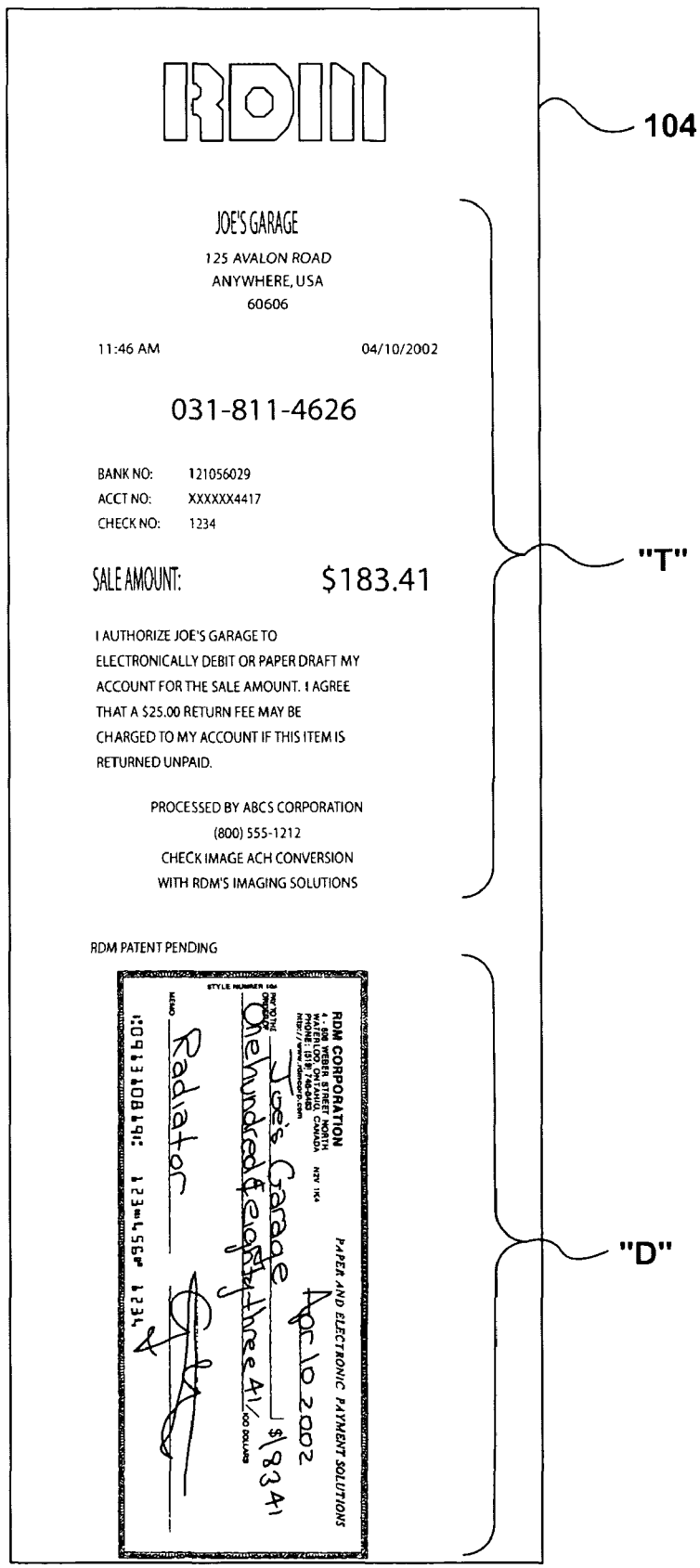
FIG. 27 is a sample of a receipt printed by a receipt printer of the apparatus including an image of the document, drawn at a larger scale.

Preferably, the apparatus 30 includes a printer 102 for printing a receipt 104 (FIG. 27). The printer 102 is adapted to print at least part of the document data 56 and at least a part of the transaction data 84 on the receipt 104. The part of the transaction data 84 which has been printed is designated as "T" in FIG. 27, and the part of the document data 56 printed on the receipt 104 is designated as "D" in FIG. 27). The printer 102 could be an integrated printer 105 or a remote printer 106 (FIGS. 2A, 2B).

In the preferred embodiment, the apparatus 30 includes an integrated display screen 99 and an integrated printer 105, so that they are located conveniently for a user (not shown).

The communication means 70 can be any suitable means for communication, including, for example, a direct wired connection to the central data processor 72, a wireless connection to the central data processor 72, or a public access network connected to the central data processor 72. Preferably, the communication means 70 is a modem.

The apparatus 30 can also include a magnetic stripe reader 108 (FIG. 3) adapted for obtaining information embedded in a magnetic stripe, for example, a magnetic stripe on a credit or debit card (not shown). The magnetic stripe information is communicated to the central data processor 72 with document data 56 for analysis.

In the preferred embodiment, the apparatus 30 also includes a stamping mechanism 110 for marking the document 32 after the approved signal 78 has been transmitted to the apparatus 30. Preferably, the stamping mechanism 110 is adapted to mark the document 32 as the document 32 is moved along the document path 42 towards the exit position 46 after the approved signal 78 has been received by the drive control means 76.

Figure 16:
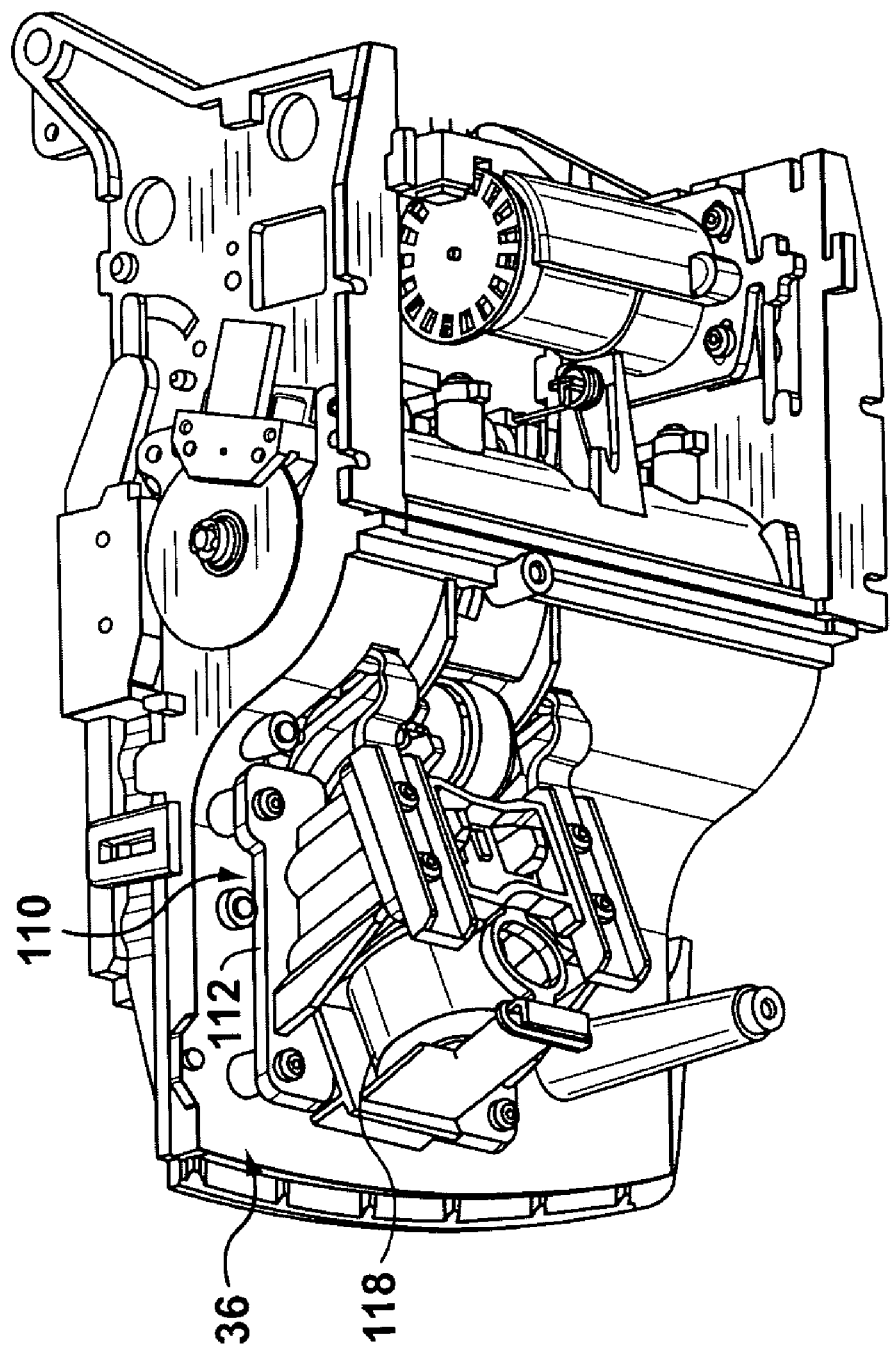
FIG. 16 is an isometric view from the bottom of a frame of the apparatus of FIG. 1.
Figure 23:
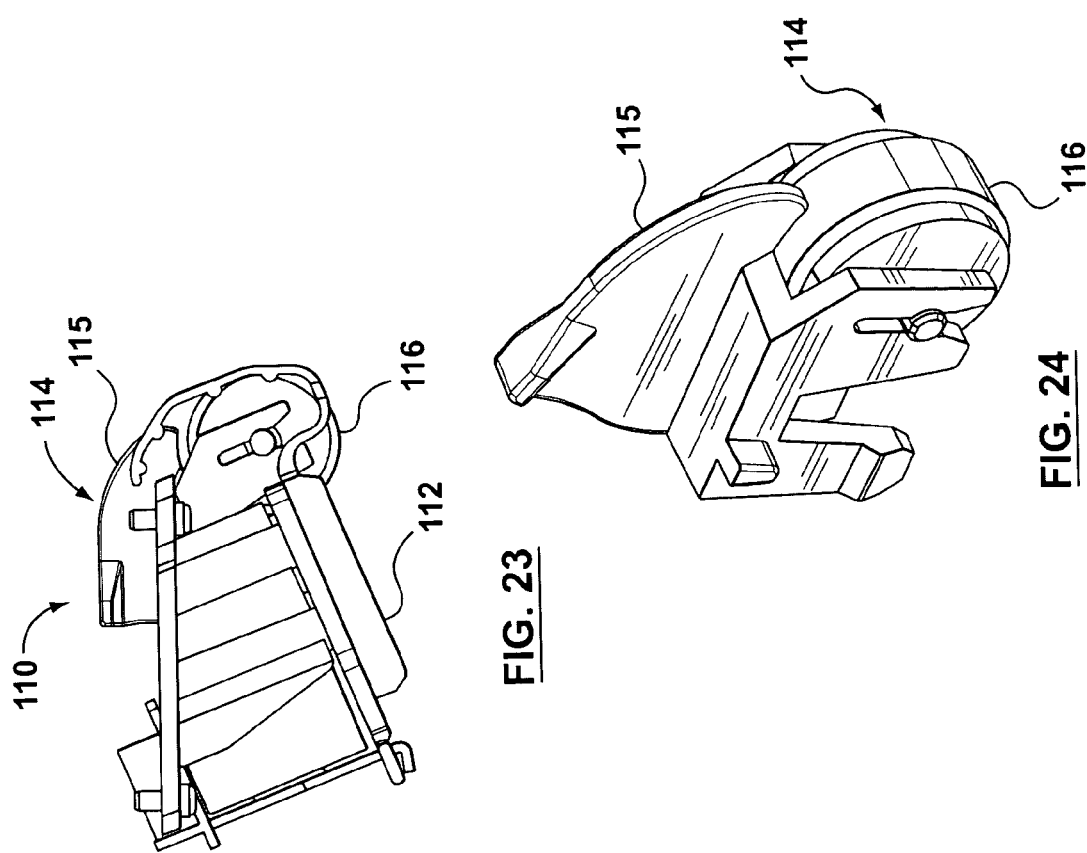
FIG. 23 is a side view of a stamping mechanism including a cartridge, drawn at a larger scale.

As can be seen in FIGS. 16 and 23, the stamping mechanism 110 preferably includes a cartridge chassis 112 attached to the frame 36 and a cartridge 114 mounted in the cartridge chassis 112. The cartridge 114 includes a cartridge body 115 and a stamp portion 116. The stamping mechanism 110 also has an actuator 118 adapted to move the cartridge body 115 in the cartridge chassis 112 between an actuated state (FIG. 12), in which the stamp portion 116 is positioned to contact the document 32 and thereby to mark the document 32, and an unactuated state (FIG. 11), in which the stamp portion 116 is maintained spaced apart from the document 32. A mark 117 made by the stamping mechanism 110 is shown on a check 86 (FIG. 28).

Various types of actuators can be used. For example, a motor and a cam, an air pressure cylinder, or a hydraulic cylinder could be used. In the preferred embodiment, the actuator 118 is a solenoid.

Preferably, the cartridge body 115 is adapted for releasable attachment to the cartridge chassis 112, so that the cartridge 114 is relatively easy to remove and replace when the ink in the stamp portion 116 has been used up.

Figure 25:
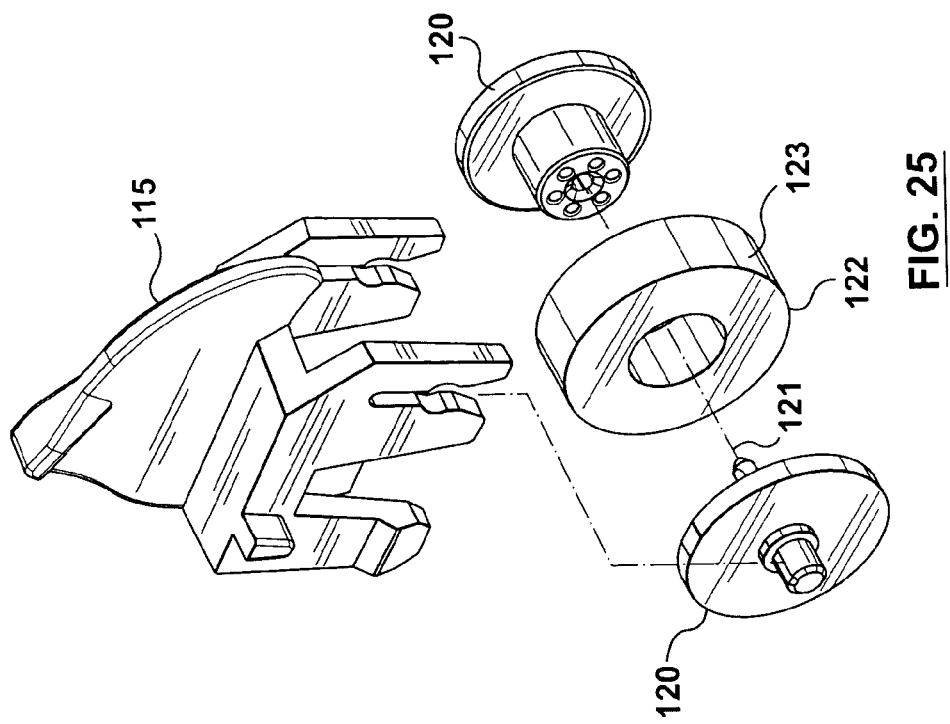
FIG. 25 is an exploded view of the cartridge of FIG. 24.
Figure 24:
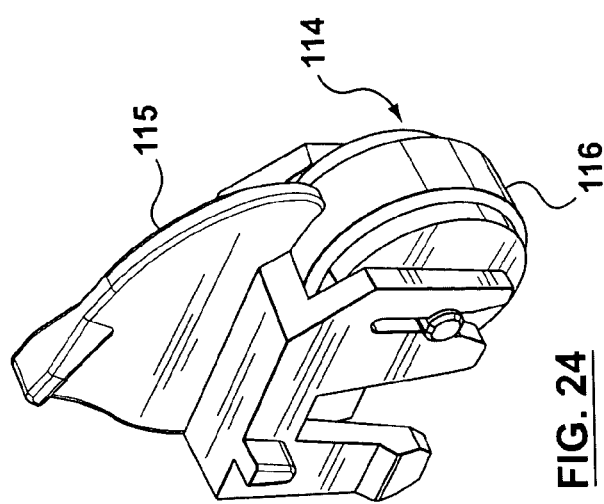
FIG. 24 is an isometric view of the cartridge of FIG. 23, drawn at a larger scale.

As can be seen in FIG. 25, the cartridge includes a wheel 120 adapted to be received and retained in the cartridge body 115, the wheel 120 being rotatable about a wheel axis 121 when positioned in the cartridge chassis 112. The stamp portion 116 also includes a stamp part 122 positionable on the wheel 120 which has a surface 123 adapted for marking a character on the document 32. The wheel 120 can comprise two cooperating parts, as shown in FIG. 25.

Preferably, the stamp part 123 is extruded high-density polyurethane foam, pre-inked with micro-pigmented ink, and thermally sealed on its outer diameter except for the printed character to be marked.

Figure 19:
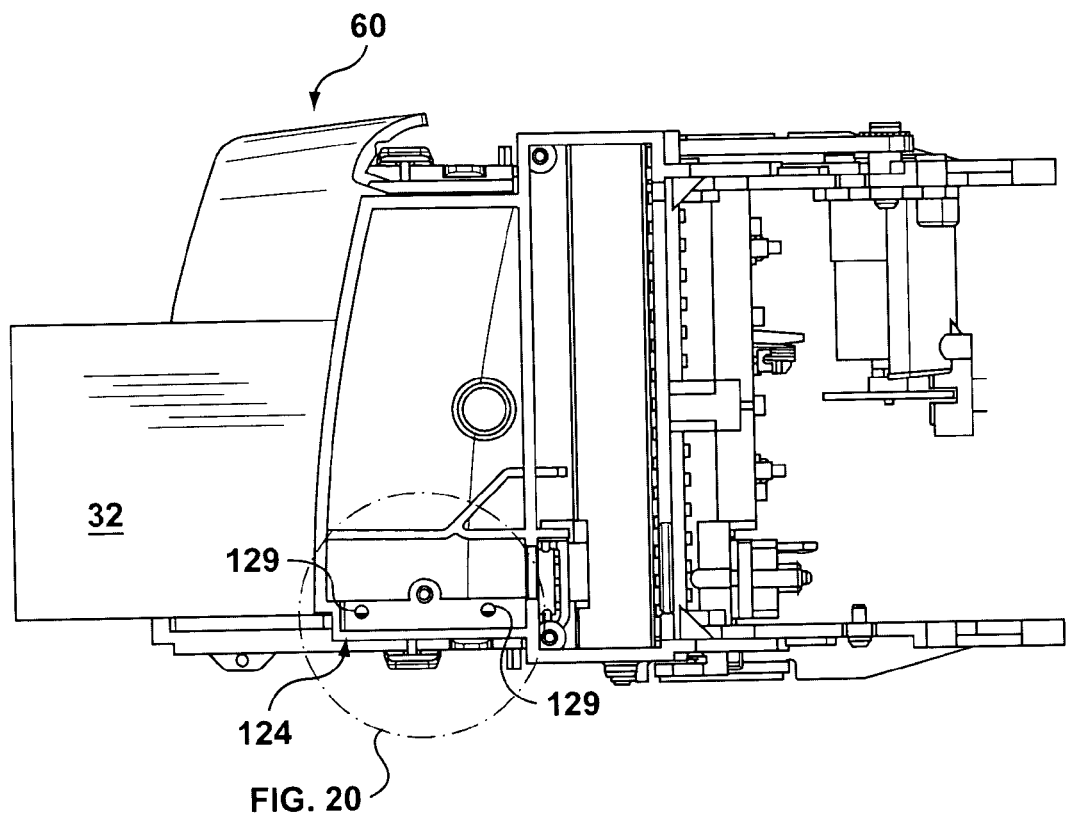
FIG. 19 is a partial top view of an input guide means mounted on the frame of FIG. 16 showing a document in position on the input guide means.
Figure 20:
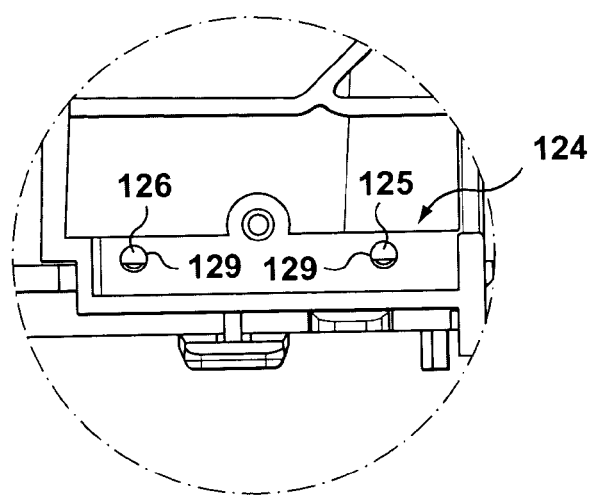
FIG. 20 is a top view of a portion of the input guide means of FIG. 19, drawn at a larger scale.

The preferred embodiment of the apparatus 30 also includes a document guide mechanism 124, as shown in FIGS. 19–21. The document guide mechanism 124 is located at the home position 44, for guiding the inserted document 32 into the document path 42. The document guide mechanism 124 is preferably positioned at an edge of the deck portion 60 to facilitate alignment of the document 32.

Figure 17:
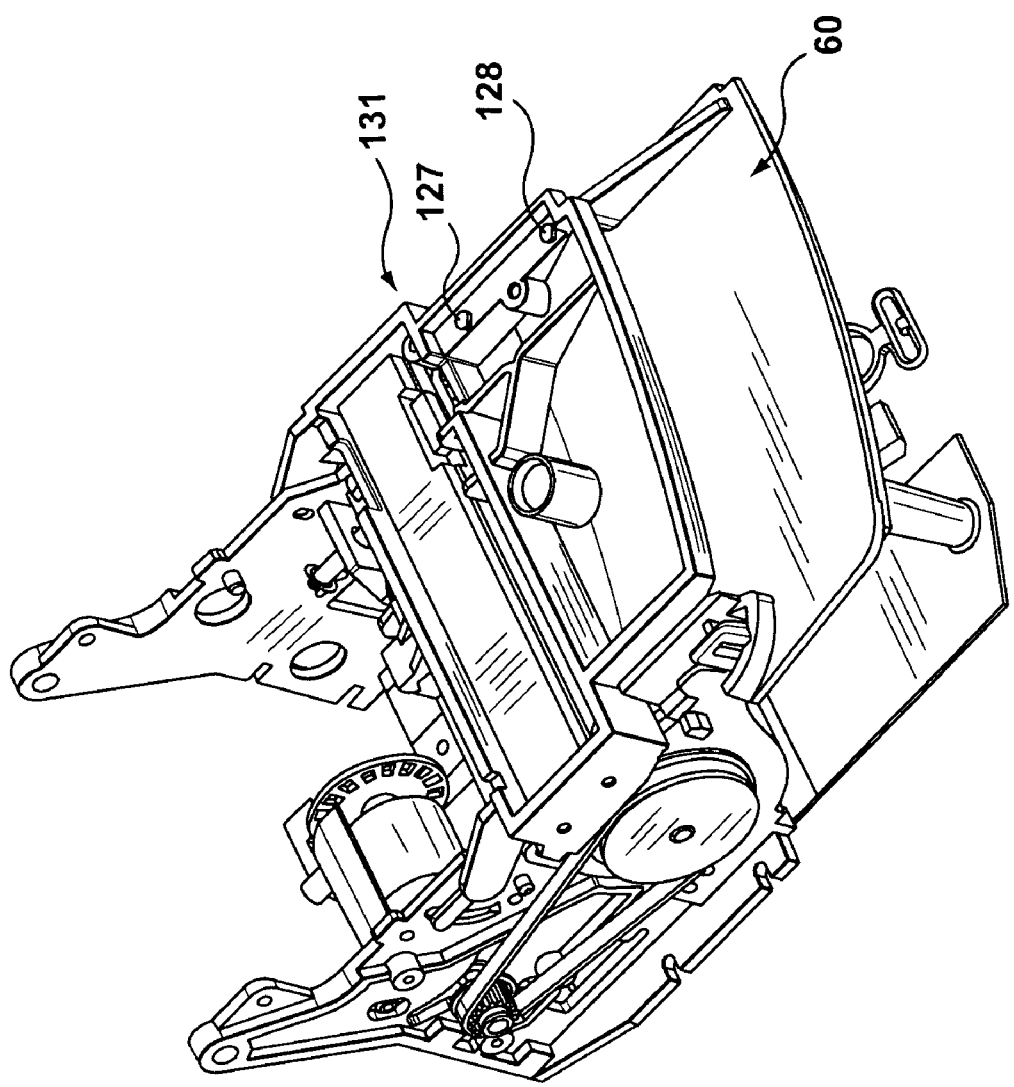
FIG. 17 is an isometric view of the frame of FIG. 16 from the front showing a contact image sensor housing mounted on the frame.
Figure 18:
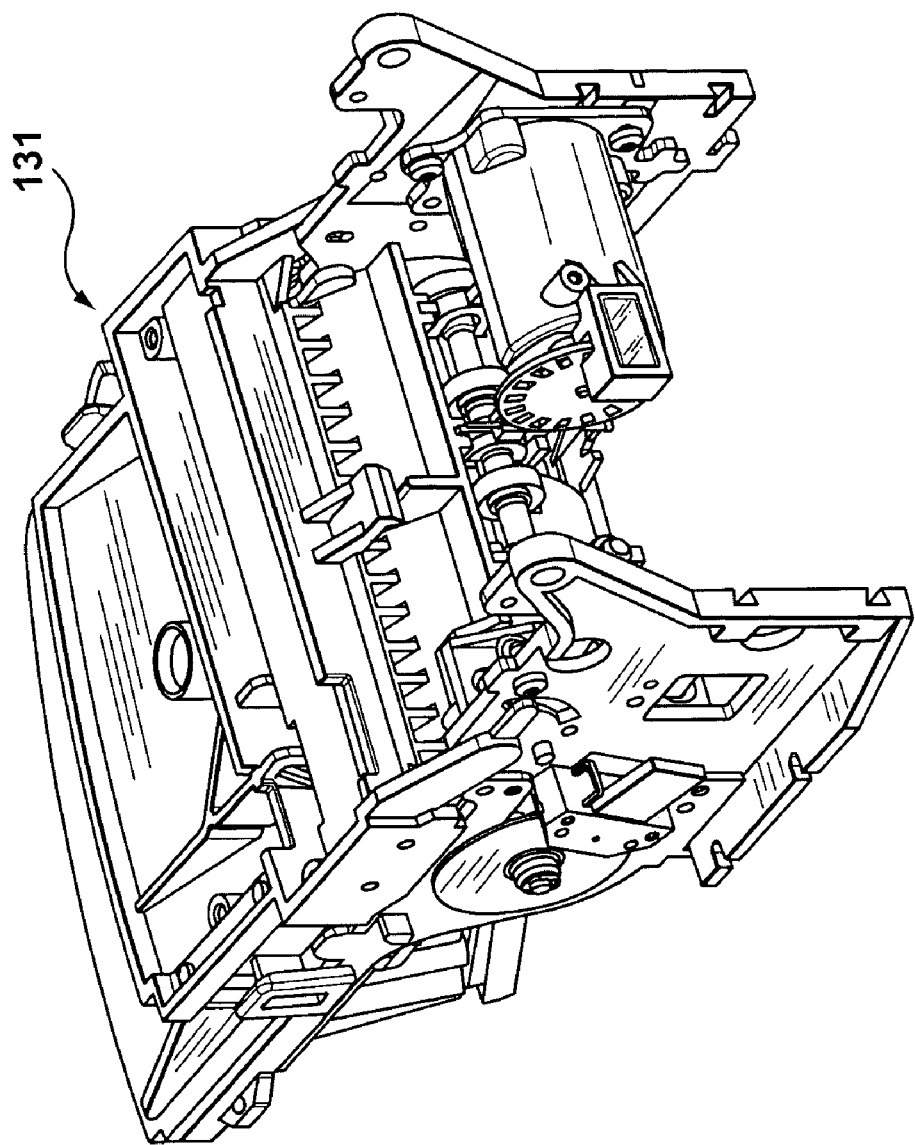
FIG. 18 is an isometric view of the frame of FIG. 16 from the back showing the contact image sensor housing.

The document guide mechanism 124 preferably includes the deck portion 60 and two light sources 125, 126. Each light source 125, 126 is positioned below the deck portion 60, and the light sources 125, 126 transmit two light beams substantially parallel to each other to create two predetermined paths of light. The light sources 125, 126 are positioned so that, when the document 32 is in the home position 44, the document 32 is located in the predetermined paths of light. The apparatus also includes two light receptors 127, 128 (FIG. 17) positioned above the light sources 125, 126 to receive the two beams of light when the document 32 is not in the home position. Preferably, the light sources 125, 126 are LEDs and the light receptors 127, 128 are photo diodes, as is known in the art. Holes 129 (FIGS. 19, 20) are provided to permit the beams of light to pass from the light sources 125, 126 to the light receptors 127, 128 which are not round in cross-section. As can be seen in FIG. 20, the holes 129 are configured to be approximately three quarters open, so that the document 32 will prevent light from the light sources 125, 126 from reaching the light receptors 127, 128 when the document 32 is in the home position. The holes 129 are located adjacent to a wall 131 in the deck portion 60.

Figure 20C:
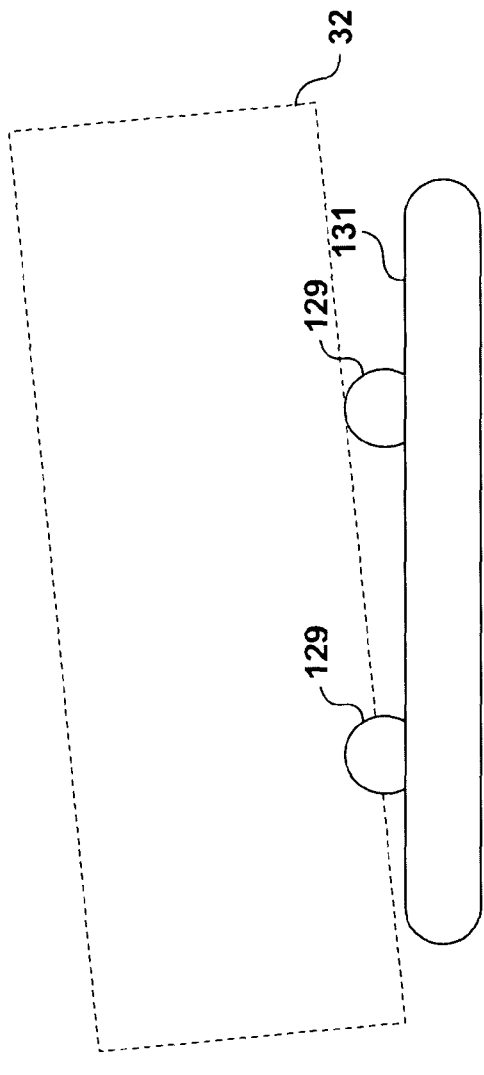
FIG. 20C is a schematic diagram representing the input guide means when the document is misaligned therein.
Figure 20D:
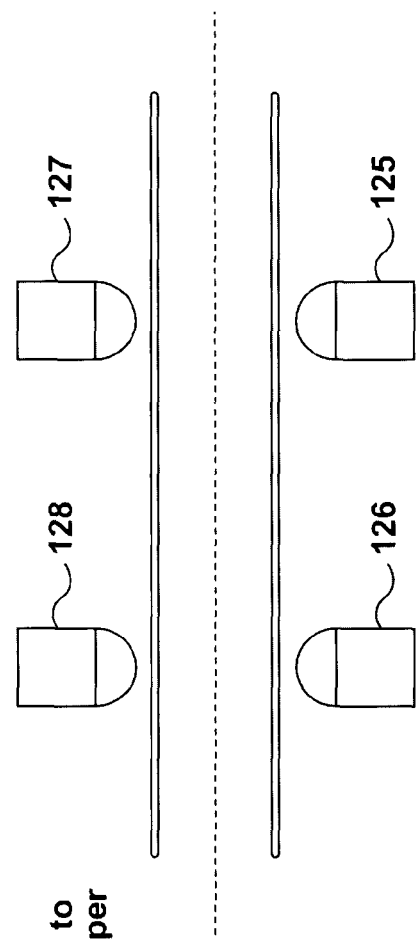
FIG. 20D is a schematic diagram representing the input guide means when the document is misaligned therein.

As can be seen in FIG. 20A, when the document 32 is abutting the wall 131, it covers the holes 129. The holes 129 are shown in FIG. 20A for convenience. The drive mechanism 38 is actuated when the document 32 is in the position shown in FIG. 20A, as indicated in FIG. 20B. In FIG. 20C, however, the document 32 is not abutting the wall 131, and light through the holes 129 is not blocked by the document 32. In this case, the drive mechanism 38 is not actuated, and the document 32 is not moved into the document path 42. Another example is shown in FIGS. 20E and 20F, in which the document 32 is aligned in the inward direction, but the document 32 is not abutting the wall 131. Once again, because the light through the holes 129 is not blocked by the document 32, the drive mechanism 38 is not actuated.

Preferably, upon the document 32 being placed in the home position 44, either a removal signal is generated or a drive mechanism actuation signal is generated. The removal signal is generated if the document 32 was rejected, and alerts the user that removal of the document 32 is required. The actuation signal is generated if the document 32 was not rejected, and actuates the drive mechanism 38.

The apparatus 30 also preferably includes a processor for controlling the apparatus 30 and associated basic memory, the integrated keypad 95 for inputting transaction data 84, and the display screen 99 for displaying document data 56.

It will be appreciated that the apparatus 30 can also include an internal database. In this embodiment, transaction data 84 is input into the internal database, as is document data 56. The document data 56 and the transaction data 84 preferably are transmitted to the central data processor 72. It is also possible, however, that the analysis of the document data 56 and the transaction data 84 could be done in a processor in the apparatus 30. In this embodiment, external data would preferably be uploaded into the internal database on a regular periodic basis.

Figure 15A:
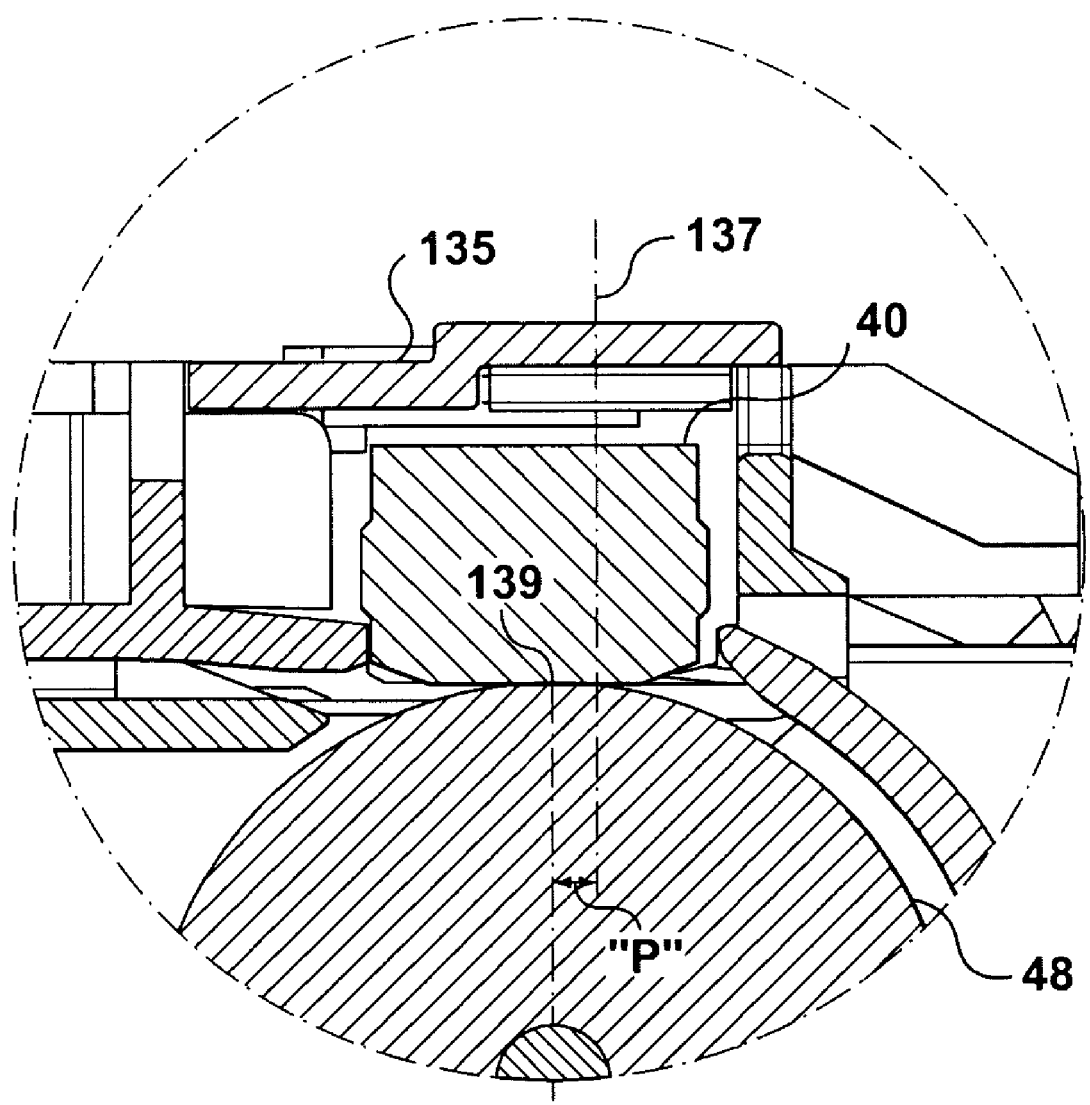
FIG. 15A is a cross-section of the apparatus of FIG. 15 taken at a larger scale showing the positioning of an image plane of the sensor relative to the roller.

Preferably, the sensor 40 is a contact image sensor secured in a contact image sensor housing 135 mounted in an imaging frame assembly 131 (FIG. 17) which is mounted to the frame 36. The contact image sensor 40 is adapted to obtain the image 88 of the document along an image plane 137 (FIG. 15A). As can be seen in FIGS. 8–15, 15A and 21A, the contact image sensor housing 135 is positioned to press the sensor 40 onto the document 32 against the roller surface 54 at a tangent point 139 at the top of the roller 48 along the width 34 of the document 32. The contact image sensor 40 is located so that the image plane 137 is positioned a predetermined distance ("P" in FIG. 15A) downstream in the inward direction of travel along the document path 42 from the tangent point 139. The inward direction is the direction of arrow "I" in FIG. 8.

Preferably, the predetermined distance ("P") is approximately 2 millimeters.

It is preferred that the imaging plane 137 be positioned downstream from the tangent point 139 because scratches on the glass of the contact image sensor 40 at the tangent point 139, and ink smearing on the glass at the tangent point 139, often impede the ability of the contact image sensor 40 to obtain image data 88. The contact image sensor 40 is positioned downstream of the tangent point 139 in order to ensure that the entire image 88 of the document 32 is captured. In contrast, in known devices, an image sensor is often positioned upstream of the tangent point to avoid the problems described above resulting from locating the sensor so that the image plane at the tangent point. However, the prior art devices are unsatisfactory because the upstream positioning results in the leading edge 33 of the document 32 (and information adjacent to the leading edge of the document) not being captured in known prior art devices.

Figure 26:
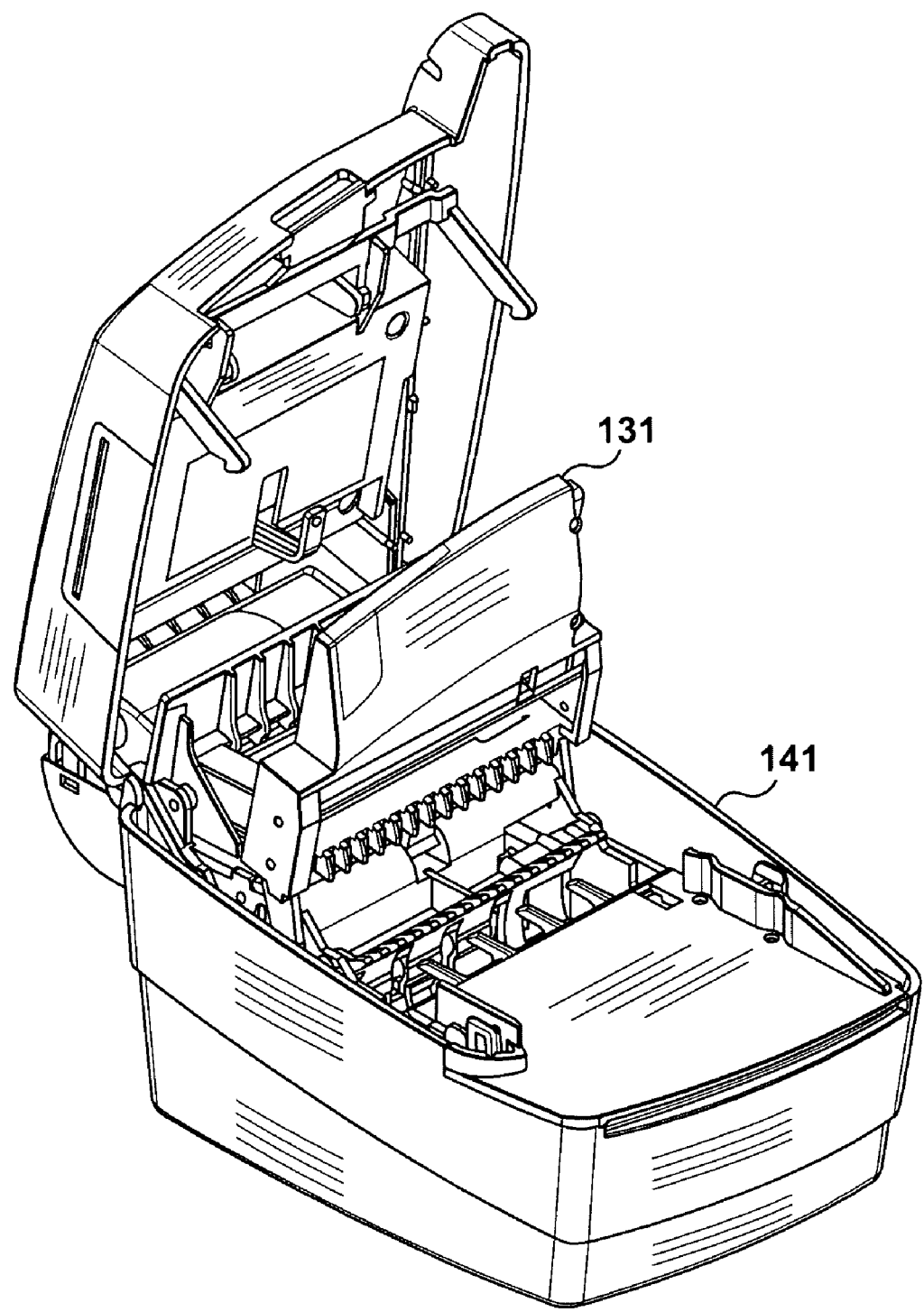
FIG. 26 is an isometric view of the apparatus of FIG. 3 with the cover portion in an open position.

The apparatus 30 is shown as including a body portion 141. Preferably, the integrated keypad assembly 95 and the display screen 99 are integral with the body portion 141. As can be seen in FIG. 26, the body portion 141 is preferably divided into two parts and can be opened to permit access to internal parts of the apparatus 30.

Figure 21A:
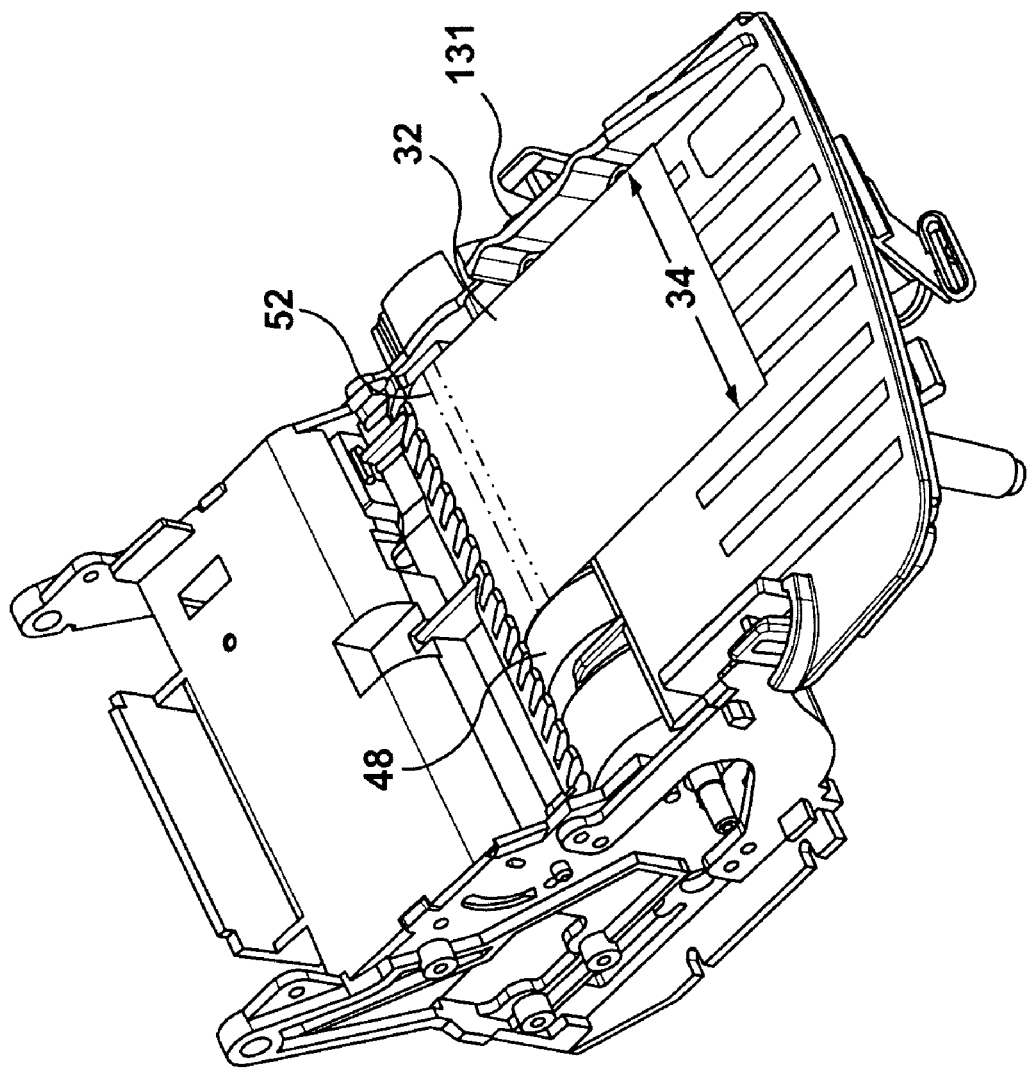
FIG. 21A is an isometric view of the frame of FIG. 21, drawn at a smaller scale, showing the document in the document path.

In use, the document 32 is located in the home position 44 using the document guide means 124 to align the document 32. The drive mechanism 38 is actuated, and the document 32 is engaged by the roller surface 54. The contact portion 52 of the document 32 is tightly compressed against the roller surface 54. As can be seen in FIG. 21A, the contact portion 52 extends along the entire width 34 of the document 32. This minimizes distortion and enables accurate data 56 to be obtained from the document 32. As can be seen in FIG. 15A, the imaging plane 137 is positioned very close to the tangent point 139, so that the image data 88 is obtained when the document 32 is virtually normal to the imaging plane 137. Furthermore, it will be appreciated that the image data 88 is obtained from the document 32 along the image plane 137 across the entire width 34 of the document 32

Similarly, the MICR reader 92 is normal to the document 32 when the MICR reader 92 obtains the MICR data 94. The idler 67 is positioned adjacent to the MICR reader 92, and the document 32 is pressed tightly against the roller surface 54 when the MICR data 94 is obtained by the MICR reader 92.

It will be appreciated that, in comparison to known devices, the use of a single roller 48 has a number of advantages. First, due to the use of the single roller 48 and the slots 58 and the fingers 62 cooperating therewith, misfeeds and jamming of the document 32 is lees likely to occur than would be the case if more than one roller were used. Second, because a single roller 48 is used, the image data 88 and the MICR data 94 are synchronized. The image data and MICR data and also transaction in known devices employing more than one roller, can sometimes be provided in an unsynchronized fashion.

Also, and as noted above, the apparatus 30 is relatively simple because it has one roller, and reliably provides image data 88 with minimal distortion because the data is taken at, or close to, the contact portion 52, i.e., off the roller 48 when the document 32 is pressed tight against the roller surface. Distortion is limited because the data is taken essentially normal to the document 32.

In addition to the foregoing advantages, the apparatus 30 has the advantage that the footprint of the apparatus 30 tends to be smaller than that of known device, because the document 32 is wrapped around the roller 48 along the document width 34. Also, the apparatus 30 has a smaller footprint because only one roller 48 is used.

In addition, where a customer (not shown) presents the document 32, the apparatus 30 conveniently returns the document 32 to the customer. It will be appreciated that the document 32, if approved, is moved in the document path 42 along the approved path 79, ultimately to be positioned in the exit position 46. In contrast, if the document 32 is rejected, it is moved along the rejection path 81 to the home position 44, The two alternate paths 79, 81 along which the document 32 is moved once a transaction decision signal 74 has been provided enable the user and the customer to readily determine whether the document was approved or rejected.

Figure 1:
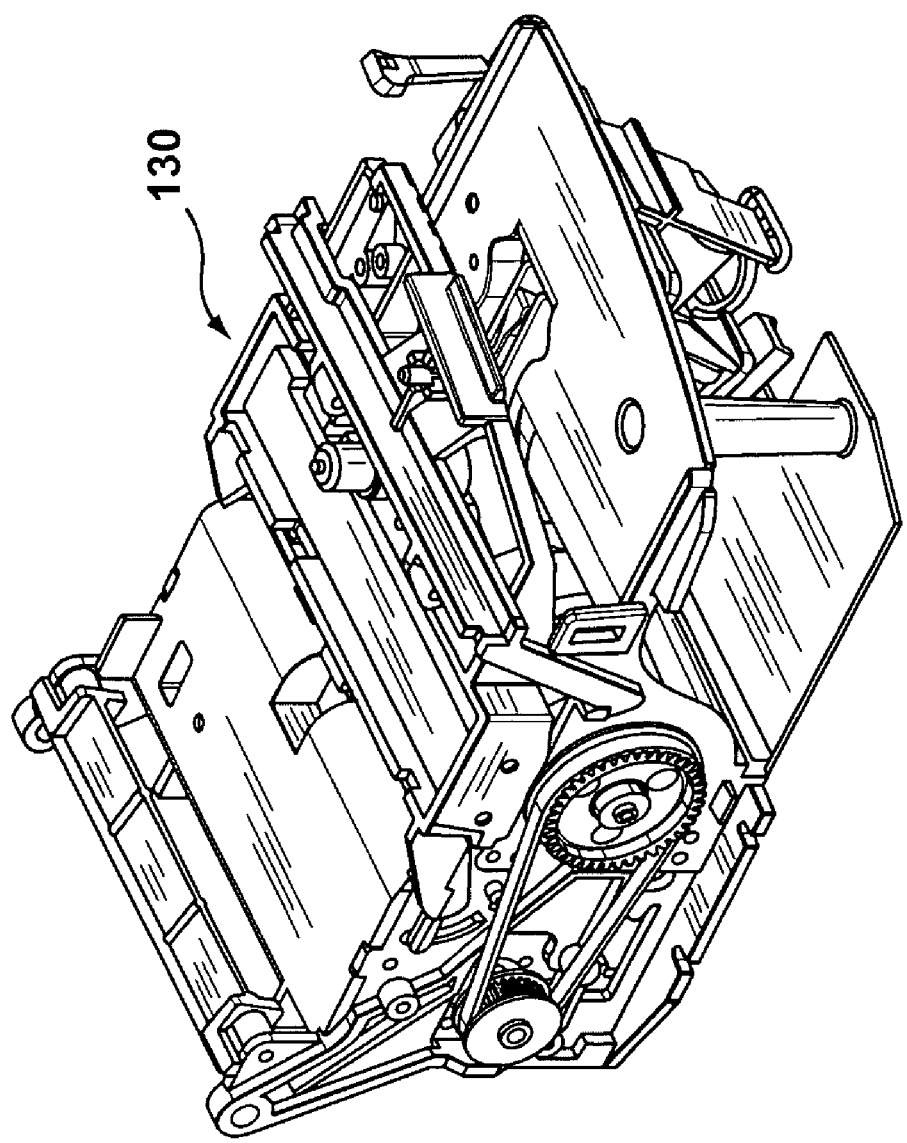
FIG. 1 is an isometric view of a preferred embodiment of the data-obtaining apparatus of the invention.
Figure 1A:
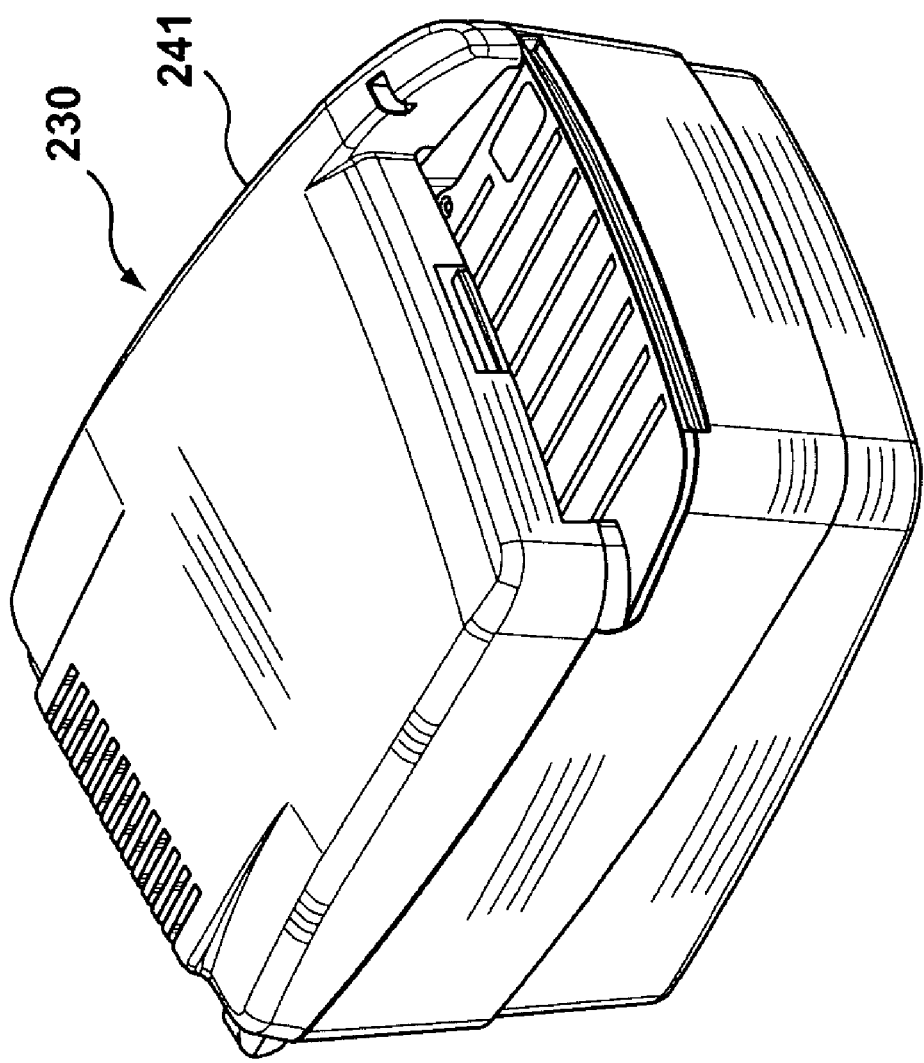
FIG. 1A is an isometric view of another embodiment of the data-obtaining apparatus of the invention including a cover in a closed position.
Figure 1B:
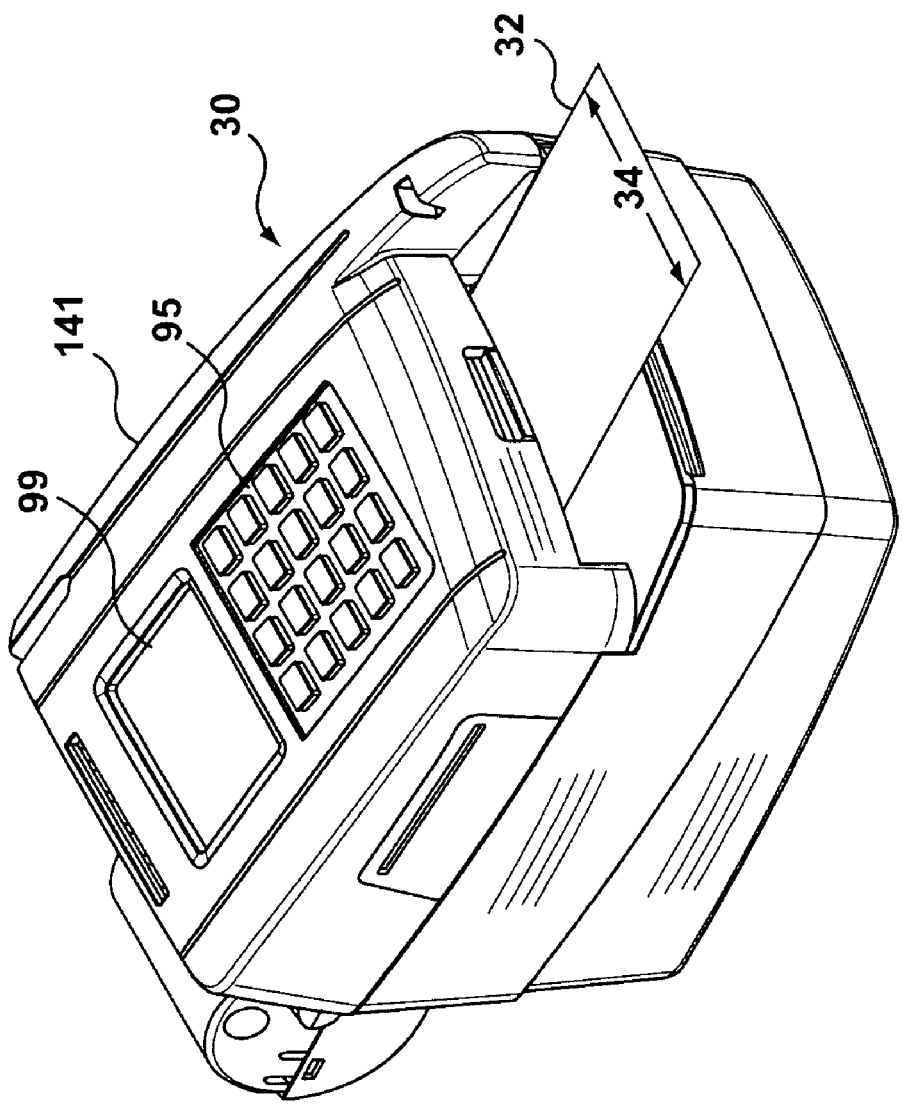
FIG. 1B is an isometric view of another embodiment of the data-obtaining apparatus of the invention including a cover, a keypad assembly, and a display screen, the cover being in a closed position, with a document inserted in the apparatus.

Additional embodiments 130, 230 of the invention are shown in FIGS. 1 and 1A respectively. In FIGS. 1 and 1A, elements are numbered so as to correspond to like elements shown in the other drawings herein.

The apparatus 130 is shown in FIG. 1 without a body portion. It will be appreciated that various forms of body portions could be used with the apparatus 130.

The alternative embodiment 230 is shown in FIG. 1A as having a body portion 241 which does not include the integrated keypad assembly 95 or the display screen 99.

It will be evident to those skilled in the art that the invention can take many forms, and that such forms are within the scope of the invention as claimed. Therefore, the spirit and scope of the appended claims should not be limited to the description of the preferred versions contained therein.

We claim:

1. An apparatus for obtaining data from a document related to at least one transaction, the apparatus comprising:
   a frame;
   a drive mechanism mounted on the frame, the drive mechanism being adapted to move the document along a document path in the apparatus between a home position, at which the document is inserted into the apparatus, and an exit position, at which the document is removable from the apparatus, the home position and the exit position being spaced apart;
   the drive mechanism comprising a roller rotatable about a roller axis for engaging a contact portion of the document extending along the width thereof, the roller having a substantially smooth surface for supporting the contact portion;
   at least one imaging sensor for obtaining document data as the document is moved by the drive mechanism along the document path, said document data comprising an image of the document;
   transaction data input means for inputting transaction data associated with said at least one transaction;
   communication means for transmitting said transaction data and a portion of said document data to a central data processor and for transmitting a transaction decision signal from the central data processor to a drive control means controlling the drive mechanism;
   said transaction data and said document data being analyzable by the central data processor during an analysis time period, to determine the transaction decision signal, the transaction decision signal being selected from the group consisting of an approved signal and a rejected signal; and
   the drive mechanism being adapted:
      to hold the document stationary during the analysis time period,
      to move the document along the document path to the exit position upon receipt of the approved signal, and
      to move the document along the document path to the home position upon receipt of the rejected signal.

2. An apparatus according to claim 1 in which:
   the roller comprises at least one slot positioned substantially transverse to the roller axis;
   the frame includes a deck portion comprising at least one finger extending from the deck portion in an inward direction of travel in the document path;
   the inward direction of travel being from the home position to the exit position; and
   said at least one finger being receivable in said at least one slot, for guiding the document along the document path when the document is moved along the document path to the home position in a direction opposite to the inward direction.

3. An apparatus according to claim 1 additionally comprising:
   a MICR reader for reading MICR characters on the document to provide recognized MICR data associated with the document, the MICR reader being positioned to read said MICR characters as the document is moved by the drive mechanism along the document path; and
   said communication means being adapted for transmitting said recognized MICR data to the central data processor, said recognized MICR data being analyzable with said transaction data and document data by the central data processor during the analysis time period to determine whether the check is approved or rejected.

4. An apparatus according to claim 1 additionally comprising a receipt printer for printing a receipt comprising the image of the document.

5. An apparatus according to claim 1 additionally comprising a receipt printer for printing a receipt, the receipt printer being adapted to print the image of the document and at least a portion of said transaction data on the receipt.

6. An apparatus according to claim 1 additionally comprising a stamping mechanism for marking the document to indicate that the document has been presented and accepted after the approved signal has been transmitted to the apparatus.

7. An apparatus according to claim 6 in which the stamping mechanism is adapted to mark the document to indicate that the document has been presented and accepted as the document is moved along the document path towards the exit position after the approved signal has been received by the drive control means.

8. An apparatus according to claim 6 in which the stamping mechanism comprises:
   a cartridge chassis attached to the frame;
   a cartridge mounted in the cartridge chassis, the cartridge including a stamp portion; and
   an actuator adapted to move the cartridge in the cartridge chassis between an actuated state, in which the stamp portion is positioned to contact the document to mark the document to indicate that the document has been presented and accepted, and an unactuated state, in which the stamp portion is maintained spaced apart from the document.

9. An apparatus according to claim 8 in which the cartridge is adapted for releasable attachment to the cartridge chassis, to permit replacement of the cartridge.

10. An apparatus according to claim 8 in which the cartridge comprises:
   a cartridge body in which the stamp portion is receivable;
   the stamp portion comprising:
      a wheel adapted to be received in the cartridge body, the wheel being rotatable about a wheel axis when positioned in the cartridge body; and
      a stamp part positionable on the wheel and having a surface adapted for marking at least one character on the document.

11. An apparatus according to claim 1 additionally comprising:
   a document guide mechanism positioned substantially at the home position, the document guide mechanism comprising:
      a substantially planar deck portion;
      at least two light sources, each said light source being positioned such that said at least two light sources transmit two beams of light substantially parallel to each other to create two predetermined paths of light;
      said at least two light sources being positioned such that, when the document is in the home position, the document is located in said predetermined paths of light; and
      at least two light receptors positioned to receive said two beams of light when the document is not in the home position,
   whereby the document prevents light from said at least two light sources from reaching said at least two light receptors when the document is in the home position.

12. An apparatus according to claim 11 in which, upon the document reaching the home position,
   a removal signal is generated indicating removal of the document is required if the document was rejected; and
   an actuation signal is generated which activates the drive mechanism, if the document was not rejected.

13. An apparatus according to claim 1 in which the imaging sensor is a contact image sensor positioned in a contact image sensor housing mounted to the frame, the contact image sensor being adapted to obtain an image of the document along an image plane disposed transverse to the document's direction of travel along the document path, the contact image sensor housing being positioned to press the document against the roller surface at a tangent point at the top of the roller, the contact image sensor being located such that the image plane is positioned a predetermined distance downstream in an inward direction of travel in the document path from the tangent point, the inward direction being from the home position to the exit position.

14. An apparatus according to claim 13 in which the predetermined distance is approximately 2 millimetres.

15. An apparatus according to claim 1 in which the imaging sensor is a contact image sensor positioned in a contact image sensor housing to press the document upon the roller surface substantially at the top of the roller and the contact image sensor is adapted to obtain the image of the document along an image plane located downstream in an inward direction of travel in the document path from the top of the roller, the image plane being substantially vertical and transverse to the document's direction of travel along the document path, the inward direction being from the home position to the exit position.

16. A cartridge for use in a stamping mechanism included in an apparatus for obtaining data from a document, the apparatus comprising a frame and a cartridge chassis attached to the frame, a drive mechanism mounted on the frame, and a document path along which the document is movable by the drive mechanism, the cartridge comprising:
   a cartridge body releasably attachable to the cartridge chassis;
   the cartridge being positionable on the cartridge chassis, the cartridge including a stamp portion;
   the cartridge being adapted to be moved by an actuator, the actuator being adapted to move the cartridge between an actuated position, in which the stamp portion contacts the document to stamp the document, and an unactuated position, in which the stamp portion is maintained spaced apart from the document.

17. A cartridge according to claim 16 in which the stamp portion comprises:
   a wheel receivable in the cartridge body, the wheel being rotatable about a wheel axis when positioned in the cartridge body; and
   a stamp part positionable on the wheel and having a surface adapted for stamping at least a character on the document.

18. A method of obtaining an image of at least a portion of a document associated with at least one transaction, the method comprising:
   (a) providing an apparatus having a document path extending between a home position and an exit position spaced apart from each other and comprising a drive mechanism adapted to move the document along the document path, the drive mechanism comprising a roller rotatable about a roller axis for engaging at least a contact portion of the document extending along the width thereof, the roller having a substantially smooth surface for supporting the contact portion of the document across the width thereof;
   (b) inserting the document in the document path;
   (c) moving the document along the document path;
   (d) providing at least one imaging sensor for obtaining an image of the document as the document is moving along the document path;
   (e) operating said at least one imaging sensor to capture the image of the document;
   (f) using a MICR reader to read MICR characters on the check as the document is moved along the document path, to provide recognized MICR data associated with the document;
   (g) inputting transaction data associated with said at least one transaction, via transaction data input means;
   (h) transmitting said transaction data and at least said recognized MICR data to a central data processor adapted to provide a transaction decision signal, said transaction decision signal being selected from the group consisting of an approved signal and a rejected signal;
   (i) using the central data processor to analyze the transaction data and said portion of the document data, to determine the transaction decision signal;
   (j) communicating the transaction decision signal to a drive control means controlling the drive mechanism;
   (k) if the transaction decision signal is the approved signal, using the drive mechanism to move the document along the document path to the exit position; and
   (l) if the transaction decision signal is the rejected signal, using the drive mechanism to move the document along the document path to the home position.

19. A method of franking a check tendered for check conversion in a transaction at a point of sale, the method comprising:
(a) inserting the check in a document path in an apparatus, the apparatus comprising a drive mechanism adapted to move the check along the document path, the document path extending from a home position to an exit position;
(b) providing a franking mechanism in the apparatus, the franking mechanism comprising:
a cartridge chassis attached to the frame,
a cartridge positioned in the cartridge chassis, the cartridge comprising a stamp portion, and
an actuator adapted to move the cartridge between an actuated position, in which the stamp portion contacts the check to frank the check, and an unactuated position, in which the stamp portion is spaced apart from the check;
(c) transmitting account data relating to the check and transaction data relating to the transaction to a central data processor, for verification of the check for the transaction;
(d) transmitting an approved signal to a drive control means controlling the drive mechanism, the approved signal being adapted to actuate the drive mechanism;
(e) moving the check to the franking mechanism upon receipt of an approved signal from the central data processor; and
(f) activating the actuator as the check is moved past the franking mechanism, to frank the check as the check is moved along the document path.

* * * * *